United States Patent
Stenneth et al.

(10) Patent No.: US 10,600,020 B2
(45) Date of Patent: Mar. 24, 2020

(54) METHOD AND APPARATUS FOR GENERATING DELIVERY DATA MODELS FOR AERIAL PACKAGE DELIVERY

(71) Applicant: HERE Global B.V., Veldhoven (NL)

(72) Inventors: Leon Stenneth, Chicago, IL (US); Leo Modica, Sawyer, MI (US)

(73) Assignee: HERE Global B.V., Veldhoven (NL)

( * ) Notice: Subject to any disclaimer, the term of this patent is extended or adjusted under 35 U.S.C. 154(b) by 772 days.

(21) Appl. No.: 14/794,371

(22) Filed: Jul. 8, 2015

(65) Prior Publication Data
US 2017/0011343 A1    Jan. 12, 2017

(51) Int. Cl.
G06Q 10/08    (2012.01)
B25J 9/16    (2006.01)

(52) U.S. Cl.
CPC ........ *G06Q 10/08355* (2013.01); *B25J 9/163* (2013.01); *G06Q 10/083* (2013.01); *Y10S 901/01* (2013.01)

(58) Field of Classification Search
CPC ............. G06Q 10/083; G06Q 10/0833; G06Q 10/0835; B25J 9/163; Y10S 901/01
USPC ................................................ 705/338, 333
See application file for complete search history.

(56) References Cited

U.S. PATENT DOCUMENTS

| | | | |
|---|---|---|---|
| 8,078,349 B1 | 12/2011 | Prada Gomez et al. | |
| 9,817,396 B1 * | 11/2017 | Takayama | G05D 1/0038 |
| 2014/0330456 A1 * | 11/2014 | Lopez Morales | G06Q 10/08355 |
| | | | 701/3 |
| 2015/0120094 A1 * | 4/2015 | Kimchi | B64C 39/024 |
| | | | 701/3 |
| 2015/0302495 A1 * | 10/2015 | Stuckman | G01S 1/00 |
| | | | 705/26.35 |
| 2016/0114905 A1 * | 4/2016 | Derenick | G06K 9/0063 |
| | | | 701/16 |

OTHER PUBLICATIONS

Zhang et. al. "Scheduling Methods for Unmanned Aerial Vehicle Based Delivery Systems"; 2014 IEE AIAA 33rd Digital Aviaonics Systems Conference (Year: 2014).*
European Office Action for related European Patent Application No. 16178452.5-1955 dated Oct. 27, 2016, 6 Pages.
(Continued)

*Primary Examiner* — Kevin H Flynn
*Assistant Examiner* — Emmett K. Walsh
(74) *Attorney, Agent, or Firm* — Ditthavong & Steiner, P.C.

(57) ABSTRACT

An approach is provided for generating delivery data models for aerial package delivery. The approach involves determining at least one delivery surface data object to represent one or more delivery surfaces of at least one delivery location, wherein the one or more delivery surfaces represents at least one surface upon which to deliver at least one package. The approach further involves causing, at least in part, a creation of at least one complete delivery data model based, at least in part, on the at least one delivery surface data object to represent the at least one delivery location. The approach further involves causing, at least in part, an encoding of at least one geographic address in the at least one complete delivery data model to cause, at least in part, an association of the at least one complete delivery data model with at least one geographic location.

19 Claims, 18 Drawing Sheets

(56) References Cited

OTHER PUBLICATIONS

IControl Networks, "2014 State of the Smart Home", IControl Insights Blog, 2014, retrieved on Aug. 6, 2015 from http://www.icontrol.com/blog/2014-state-smart-home/, pp. 1-8.

Bora, "Amazon Working on Drone Based Delivery Service: Aerial Vehicles Known as 'Octocopters' Expected to Deliver Packages in 30 Minutes", International Business Times report, Dec. 2, 2013, retrieved on Aug. 6, 2015 from http://www.ibtimes.com/amazon-working-drone-based-delivery-service-aerial-vehicles-known-octocopters-expected-deliver, 3 Pages.

Hern, "DHL launches first commercial drone 'parcelcopter' delivery service", Technology: The Guardian report, Sep. 25, 2014, retrieved on Aug. 6, 2015 from http://www.theguardian.com/technology/2014/sep/25/german-dhl-launches-first-commercial-drone-delivery-service, pp. 1-2.

Madrigal, "Inside Google's Secret Drone-Delivery Program", Technology: The Atlantic report, Aug. 28, 2014, retrieved on Aug. 6, 2015 from http://www.theatlantic.com/technology/archive/2014/08/insidegooglessecretdronedeliveryprogram/379306/, pp. 1-29.

Office Action for the related European Patent Application No. 16178452.5-1217, dated Oct. 19, 2018, 9 pages.

\* cited by examiner

METHOD AND APPARATUS FOR GENERATING DELIVERY DATA MODELS FOR AERIAL PACKAGE DELIVERY

BACKGROUND

Service providers and device manufacturers (e.g., wireless, cellular, etc.) are continually challenged to deliver value and convenience to consumers by, for example, providing compelling network services. One area of interest has been delivery of goods to intended purchasers at their respective geographic delivery locations. However, service providers encounter multiple difficulties while delivering goods to a customer. First, an aerial delivery vehicle finds it difficult to detect a surface of a delivery location associated with the customer, at which a delivery package can be placed (e.g., an entrance, a driveway, etc.). In addition, objects present at the delivery locations may also obstruct delivery of packages at the geographic addresses. Further, if a predetermined surface of the delivery location is provided to the aerial delivery vehicle, then the aerial delivery vehicle finds it difficult to determine a new or an alternate surface due to unavoidable circumstances (e.g., environmental conditions) for placing the delivery package. Accordingly, there is a need for generating delivery data models for aerial package delivery to safely deliver packages.

SOME EXAMPLE EMBODIMENTS

Therefore, there is a need for an approach for generating delivery data models for aerial package delivery.

According to one embodiment, a method comprises determining at least one delivery surface data object to represent one or more delivery surfaces of at least one delivery location, wherein the one or more delivery surfaces represents at least one surface upon which to deliver at least one package. The method also comprises causing, at least in part, a creation of at least one complete delivery data model based, at least in part, on the at least one delivery surface data object to represent the at least one delivery location. The method further comprises causing, at least in part, an encoding of at least one geographic address in the at least one complete delivery data model to cause, at least in part, an association of the at least one complete delivery data model with the at least one geographic location.

According to another embodiment, an apparatus comprises at least one processor, and at least one memory including computer program code for one or more computer programs, the at least one memory and the computer program code configured to, with the at least one processor, cause, at least in part, the apparatus to determine at least one delivery surface data object to represent one or more delivery surfaces of at least one delivery location, wherein the one or more delivery surfaces represents at least one surface upon which to deliver at least one package. The apparatus is also caused to cause, at least in part, a creation of at least one complete delivery data model based, at least in part, on the at least one delivery surface data object to represent the at least one delivery location. The apparatus is further caused to cause, at least in part, an encoding of at least one geographic address in the at least one complete delivery data model to cause, at least in part, an association of the at least one complete delivery data model with the at least one geographic location.

According to another embodiment, a computer-readable storage medium carries one or more sequences of one or more instructions which, when executed by one or more processors, cause, at least in part, an apparatus to determine at least one delivery surface data object to represent one or more delivery surfaces of at least one delivery location, wherein the one or more delivery surfaces represents at least one surface upon which to deliver at least one package. The apparatus is also caused to cause, at least in part, a creation of at least one complete delivery data model based, at least in part, on the at least one delivery surface data object to represent the at least one delivery location. The apparatus is further caused to cause, at least in part, an encoding of at least one geographic address in the at least one complete delivery data model to cause, at least in part, an association of the at least one complete delivery data model with the at least one geographic location.

According to another embodiment, an apparatus comprises means for determining at least one delivery surface data object to represent one or more delivery surfaces of at least one delivery location, wherein the one or more delivery surfaces represents at least one surface upon which to deliver at least one package. The apparatus also comprises means for causing, at least in part, a creation of at least one complete delivery data model based, at least in part, on the at least one delivery surface data object to represent the at least one delivery location. The apparatus further comprises means for causing, at least in part, an encoding of at least one geographic/postal address in the at least one complete delivery data model to cause, at least in part, an association of the at least one complete delivery data model with the at least one geographic location.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for generating delivery data models for aerial package delivery are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
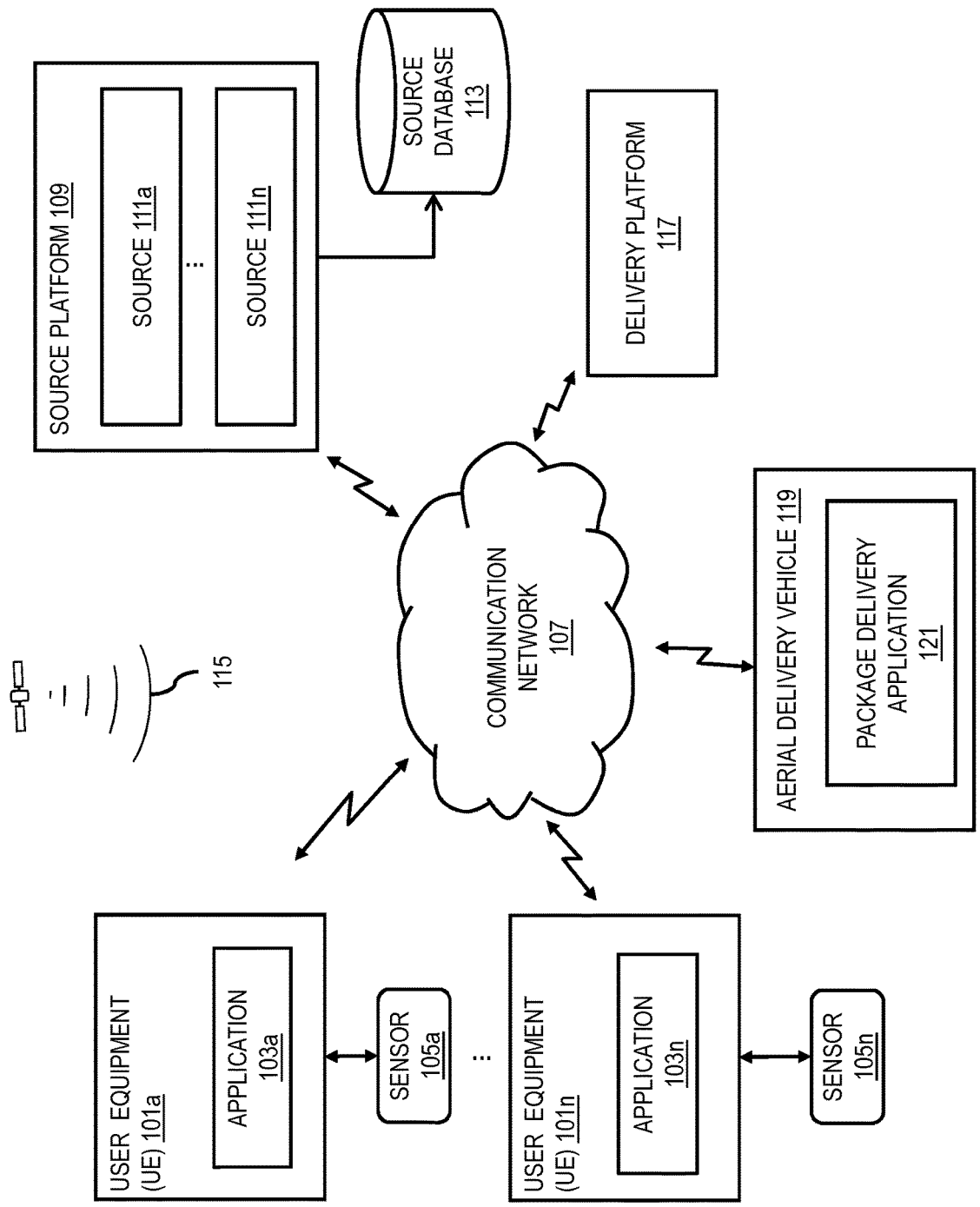
FIG. 1 is a diagram of a system capable of generating delivery data models for aerial package delivery, according to one embodiment.

FIG. 1 is a diagram of a system capable of generating delivery data models for aerial package delivery to deliver packages at geographic addresses, according to one embodiment. Generally, a user provides a geographical address for delivery of a purchased package. For example, a customer purchases a package from an ecommerce website and orders it for home delivery at a geographical address. Aerial delivery vehicles or autonomous vehicles, nowadays, provide the delivery of the package to the geographical address. However, while delivering packages at the geographical addresses, the aerial delivery vehicles may not know at which surface the package is to be delivered, or whether any obstacle is present on the surface or not. For example, an aerial delivery vehicle delivers a package on a flowerpot on a walkway of a building, which may damage the package. In addition, the aerial delivery vehicle may be trapped in branches or flowers of the flowerpot while delivering the package, which further damages the aerial delivery vehicle. Further, if the surface is known, then it is difficult to determine whether the package can be delivered at the surface or not, due to large dimensions of the package. For example, if a dimension of a package to be delivered is larger than the dimension of a surface, then it is difficult for the aerial delivery vehicle to place the package at that surface, and may further damage the package. Furthermore, due to environmental conditions, it is difficult for the aerial delivery vehicle to deliver the package at a predefined surface. However, conventional techniques do not enable the aerial delivery vehicle to determine a surface at a geographic location in real time environment to safely place the package. As a result, there is a need for a method to create at least one delivery data model for at least one an aerial delivery vehicle to delivery at least one package at a geographic address.

To address this problem, a system 100 of FIG. 1 introduces the capability to generate delivery data models for unmanned aerial delivery vehicles to deliver packages at geographic addresses. In one embodiment, the system 100 receives a request from a customer to deliver a package at a geographic address associated with the user. The geographic address may include, but not restricted to, a house number, a floor number (in case of multistory building), a street name, a district, a country, a postal code, location in the form of latitude, longitude, altitude, and the like, or a combination thereof. In one embodiment, the system 100 may configure an autonomous vehicle, a drone, or an aerial delivery vehicle 119 to deliver the package at the geographic address. In one implementation, a pilot at a ground station may remotely control the aerial delivery vehicle 119. In another implementation, the aerial delivery vehicle 119 may fly autonomously based dynamic automation systems. The system 100 determines source data from various sources to determine one or more surfaces associated with the geographic address for delivering the package. Further, the system 100 creates delivery data models to geometrically represent a geographic delivery location of the geographic address for aerial package delivery. Based on the delivery data models, the aerial delivery vehicle may safely deliver the package at the geographic location associated with the geographic address.

As shown in FIG. 1, the system 100 comprises user equipment 101a-101n (collectively referred to as user equipment 101). In one embodiment, the user equipment 101 may include, but is not restricted to, any type of a mobile terminal, a fixed terminal, or a portable terminal. Examples of the user equipment 101, may include, but not restricted to, a mobile handset, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), or any combination thereof, including the accessories and peripherals of these devices, or any combination thereof. In one embodiment, the user equipment 101 may support any type of interface for supporting the presentment of geographic delivery locations to the aerial delivery vehicle for delivering packages. In addition, the user equipment 101 may facilitate various input means for receiving and generating delivery models, including, but not restricted to, a touch screen capability, a keyboard and keypad data entry, a voice-based input mechanism, and the like. Any known and future implementations of the user equipment 101 may also be applicable.

The user equipment 101 may further include applications 103a-103n (collectively referred to as application 103). Further, the application 103 may include various applications such as, but not restricted to, an ecommerce application, a package tracking/reading application, a location-based service application, a navigation application, a content provisioning application, a camera/imaging application, a media player application, a social networking application, and the like. In one embodiment, the application 103 may be installed within the user equipment 101. In one example embodiment, an ecommerce application may be installed in the user equipment 101 to enable the user to purchase packages from multiple ecommerce websites. In another embodiment, the application 103 may be considered as a Graphical User Interface (GUI) that provides options to the user to select and purchase packages from the ecommerce websites. For example, a user browsing on an ecommerce website desires to purchase a mobile phone then the user selects a mobile phone and initiates a financial transaction to purchase it.

The system 100 also includes sensor 105a-n (collectively referred to as sensor 105). The sensor 105 may be any type of sensor. In certain embodiments, the sensor 105 may include, for example, but not restricted to, a Global Positioning Sensor (GPS) for gathering location data, Light Detection And Ranging (LIDAR) for gathering distance data, a network detection sensor for detecting wireless signals or receivers for different short-range communications (e.g., Bluetooth™, Wi-Fi, Li-Fi, Near Field Communication (NFC) etc.), temporal information sensors, a camera/imaging sensor for gathering image data, a package tracking sensor for tracking the package movement, and the like. In one implementation, radar, sonar, infrared sensors, and the like may be used to determine a surface of the geographic address to deliver the package.

Further, various elements of the system 100 may communicate with each other through a communication network 107. The communication network 107 of the system 100 includes one or more networks such as, but not restricted to, a telephony network, a service provider network, a data network, a wireless network, and the like. For illustrative purposes, the communication network 107 may be any suitable wireless network, and managed by service providers. For example, the telephony network may include, but is not restricted to, a circuit-switched network, such as the Public Switched Telephone Network (PSTN), an Integrated Services Digital Network (ISDN), a Private Branch Exchange (PBX), or other like networks. The communication network 107 may be separate entities and/or completely or partially contained within one another, or may embody of the aforementioned infrastructures. For instance, the service provider network may embody circuit-switched and/or packet-switched networks that may include facilities to provide for transport of circuit-switched and/or packet-based communications. It is further contemplated that the communication network 107 may include components and facilities to provide signaling and/or bearer communications between the various elements or facilities of the system 100. In this manner, the communication network 107 may embody or include portions of a Signaling System 7 (SS7) network, or other suitable infrastructure to support control and signaling functions. In addition, the system 100 may operate as separate parts that rendezvous and synchronize periodically to form a larger system with similar characteristics. Further, the data network may be any Local Area Network (LAN), Metropolitan Area Network (MAN), Wide Area Network (WAN), the Internet, or any other suitable packet-switched network, such as a commercially owned, proprietary packet-switched network, such as a proprietary cable or fiber-optic network. Further, the wireless network may employ various technologies including, for example, Code Division Multiple Access (CDMA), Enhanced Data Rates For Global Evolution (EDGE), General Packet Radio Service (GPRS), Mobile Ad Hoc Network (MANET), Global System For Mobile Communications (GSM), 4G Long-Term Evolution (LTE), Internet Protocol Multimedia Subsystem (IMS), Universal Mobile Telecommunications System (UMTS), etc., as well as any other suitable wireless medium, e.g., microwave access (WiMAX), Wireless Fidelity (Wi-Fi), satellites, Wireless LAN (WLAN), Bluetooth®, Internet Protocol (IP) data casting, and the like, or any combination thereof.

The system 100 further includes a source platform 109 including one or more sources 111a-n (collectively referred to as source 111). The source 111 is used to determine source data associated with the building, a geographic location, a geographic address, or a combination thereof. In one implementation, the building is associated with the geographic location of the geographic address. In one embodiment, the geographic location is a geographic delivery location at which a package is to be delivered. Examples of the source 111 may include, but not restricted to, Light Detection And Ranging (LIDAR), building schematics, pedestrian probes, sensors such as the sensor 105, aerial imagery, depth maps, crowd-sources, and the like, or a combination thereof. In an embodiment, the source data may be retrieved from satellites 115 in real time, and the like. The source platform 109 may store the source data in a source database 113.

Further, the system 100 includes a delivery platform 117 to encode the geographic address in a delivery data model. In one embodiment, the delivery platform 117 is configured to determine source data associated with the geographic address from various sources. The source data may include, but not restricted to, LIDAR information, pedestrian probe data, sensor data, depth map information, aerial imagery data, crowd sourced information, building schematic information, and the like, or a combination thereof. In one implementation, the source data is retrieved from the source database 113. In another implementation, the source data is determined from the source 111 in real time environment.

Further, the delivery platform 117 is configured to process the source data to determine entrances associated with the delivery location of the geographic address. The entrance is a point from which a user may enter into a building. Examples of the entrance may include, but not restricted to, a front door, a back door, a side door, a window, a balcony, and the like. In one embodiment, the delivery platform 117 is configured to process the source data to determine approach paths to the entrances associated with the geographic address. The approach path may be a path associated with the building through which a user may walk towards the entrance of the building. In one embodiment, the approach paths may include, but are not restricted to, driveways, walkways, porches, rooftops, and the like, or a combination thereof.

In another embodiment, the delivery platform 117 is configured to determine delivery surface data objects. The delivery surface data objects may represent delivery surfaces of the delivery location associated with the geographic address. A delivery surface is a surface upon which a package may be delivered by the aerial delivery vehicle 119. In another embodiment, the delivery platform 117 is configured to determine restricted access surface data objects. The restricted access surface data object may represent restricted access surfaces of the delivery location associated with the geographic address. A restricted access surface is a surface surrounding the delivery surface, which may be impenetrable by the aerial delivery vehicle 119. In one embodiment, delivery of a delivery package by the aerial delivery vehicle 119 is restricted on the restricted access surfaces. The delivery platform 117 is further configured to determine boundary elements of the delivery surfaces, restricted access surfaces, or a combination thereof. The boundary elements may represent boundary of the delivery surfaces, restricted access surfaces, or a combination thereof. The delivery platform 117 is further configured to determine delivery edges of the delivery surfaces. A delivery edge is a preferred side of the delivery surface for placing a delivery package. In one implementation, the boundary edges are determined from the boundary elements.

The delivery platform 117 is further configured to generate ranks for the delivery surface data objects associated with the geographic address. In one implementation, the user may generate a rank for each of the delivery surface data objects by selecting a preferred delivery surface for receiving the package at the surface. In another implementation, the delivery platform 117 may dynamically generate a rank for each of the delivery surface data objects based on ranking criteria such as, proximity to the entrance associated with the geographic address, environmental conditions associated with the geographic address and/or a delivery route, a crime statistics, and the like, or a combination thereof.

The delivery platform 117 is configured to create a complete delivery data model based on the delivery surface data objects, restricted access surface data object, their ranks, or a combination thereof to represent a delivery location associated with the geographic address. The delivery platform 117 is further configured to encode the geographic address in the complete delivery data model to associate the complete delivery data model with the geographic location. In one implementation, the complete delivery data model may be associated with, but not restricted to, a link identifier of a map link in a map database, a percent distance from a reference node in the map database, a side of the map link, a perpendicular distance from the map link, a Universal Location Reference (ULR), and the like or a combination thereof.

The delivery platform 117 is configured to encode information associated with the package to be delivered at the delivery location. The information may include, but not restricted to, delivery information, package information, recipient information, address information, sender information, or a combination thereof. The information may be encoded in codes associated with the package, delivery location, geographic location, or a combination thereof. In one implementation, the codes may include, but not restricted to, machine-readable optical labels, wireless beacon signals, NFC signals, or a combination thereof. Examples of the codes may include, but not restricted to, Quick Response (QR) codes, bar codes, or any other two dimensional (2D) or three-dimensional (3D) way of graphical representation of information.

Further, the encoded information is transmitted to a package delivery application 121 of the aerial delivery vehicle 119 to deliver the package at the geographic address. The package delivery application 121 is configured to determine information from the codes and then deliver the package based on the information. The package delivery application 121 may deliver the package on a landing pad placed in the delivery location for the aerial delivery vehicle 119. The package delivery application 121 is further configured to notify the customer about the delivery of the package at the delivery location. The package delivery application 121 is further configured to provide notifications to the customer about the delivery of the package at the delivery location. In one example embodiment, the notification may include, but not restricted to, a day, a time, a place of delivery of the package.

By way of example, the UE 101, the source platform 109, and the delivery platform 117, and the package delivery application 121 of the aerial delivery vehicle 119 may communicate with each other and other components of the communication network 107 by using well known, new or still developing protocols. In this context, a protocol includes a set of rules defining how the network nodes within the communication network 107 interact with each other based on information sent over communication links. The protocols are effective at different layers of operation within each node, from generating and receiving physical signals of various types, to select a link for transferring those signals, to the format of information indicated by those signals, to identify which software application executing on a computer system sends or receives the information. The conceptually different layers of protocols are described for exchanging information over a network in the Open Systems Interconnection (OSI) Reference Model. Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol may be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
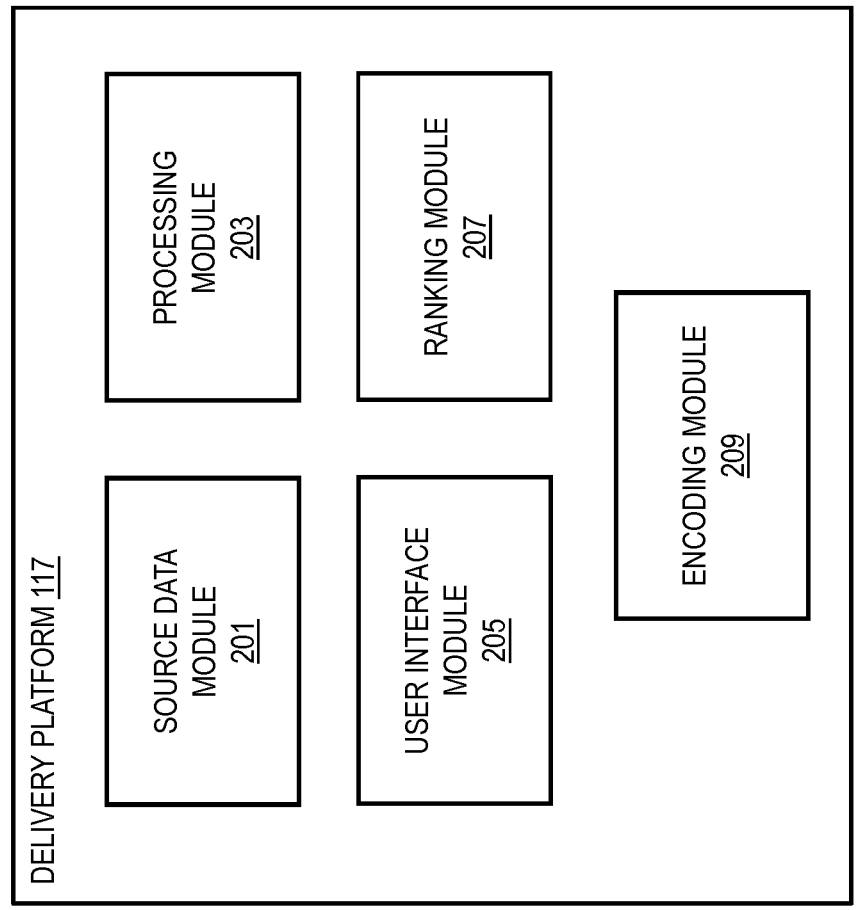
FIG. 2 is a diagram of the components of a delivery platform 117, according to one embodiment.

FIG. 2 is a diagram of components of the delivery platform 117, according to one embodiment. By way of example, the delivery platform 117 includes one or more components for encoding a geographic address in a complete delivery data model. It is contemplated that the functions of these components may be combined in one or more components or performed by other components of equivalent functionality. In this embodiment, the delivery platform 117 includes, but not restricted to, a source data module 201, a processing module 203, a user interface module 205, a ranking module 207, and an encoding module 209.

In one embodiment, the source data module 201 may receive a geographic address to deliver a package at the geographic address. The geographic address may include, but not restricted to, a house number, a floor number (in case of multistory building), a street name, a district, a country, a postal code, and the like, or a combination thereof. In one implementation, the source data module 201 may receive the geographic address from a customer associated with the package. In another implementation, the source data module 201 may determine the geographic address from a navigation device (e.g., a GPS device) used by the customer while placing an order for the package. In other implementation, the geographic address may be determined from a profile of the customer, which may be created on an ecommerce website. In another implementation, the location and/or position of the user equipment 101 associated with the customer may be used to determine the geographic address.

In one embodiment, the source data model 201 may determine source data associated with the geographic address from various sources. In one implementation, the source may include, but not restricted to, Light Detection And Ranging (LIDAR), building schematics, depth maps, crowd sourcing (e.g., neighbors), aerial imagery, pedestrian probes (e.g., building owners, tenants, package delivery drivers, etc.), and the like, or a combination thereof. The source data may include, but not restricted to, building schematics information, LIDAR information, probe data, sensor data, depth map information, aerial imagery data (e.g., pavements adjoining a main entrance), imagery information, crowd-sourced information, and the like, or a combination thereof. In one implementation, the source data may be determined from the source database 113. In another implementation, the source data may be determined from the source 111 in real time environment.

In one embodiment, the processing module 203 may process and/or facilitate a processing of the source data to determine entrances of the building associated with the geographic address. As previously noted, the entrance may include, but not restricted to, a front door, a back door, a side door, a window, a balcony, and the like. In one embodiment, the processing module 203 may process and/or facilitate a processing of the source data to determine approach paths to the entrances associated with the geographic address. The approach paths may include, but are not restricted to, driveways, walkways, porches, rooftops, and the like, or a combination thereof.

In another embodiment, the processing module 203 may process and/or facilitate a processing of the source data to determine delivery surface data objects. The delivery surface data objects may represent delivery surfaces of the delivery location associated with the geographic address. A delivery surface is a surface upon which a package may be delivered by the aerial delivery vehicle 119. In one example embodiment, the delivery surface may be, but not restricted to, a three-dimensional horizontal surface that may comprise three-dimensional splines. In another example embodiment, the delivery surface may be, but not restricted to, a vertical surface such as, a wall. In one implementation, the delivery surface data object associated with the delivery surfaces may include holes. In one example embodiment, a delivery surface may adjoin one or more delivery surfaces at the geographic address. In one scenario, the interior of the delivery surface may be tessellated, or generalized as needed for the package delivery.

In one embodiment, the processing module 203 may process and/or facilitate a processing of the source data to determine restricted access surface data objects. The restricted access surface data may represent restricted access surfaces of the delivery location associated with the geographic address. A restricted access surface is a surface surrounding the delivery surface, which may be impenetrable by the aerial delivery vehicle 119. In one embodiment, delivery of a delivery package by the aerial delivery vehicle 119 is restricted on the restricted access surfaces. Examples of the restricted access surface include a surface of, but not restricted to, a door, a window, garden, and the like of the building associated with the geographic address. In one embodiment, a restricted access surface may be adjacent to the one or more delivery surfaces. In another embodiment, a restricted access surface may be adjacent to other restricted access surfaces, such as overhead.

In one embodiment, the processing module 203 may process and/or facilitate a processing of the source data to determine boundary elements of the delivery surfaces, restricted access surfaces, or a combination thereof. The boundary elements may represent boundaries of the delivery surfaces, restricted access surfaces, or a combination thereof. In one example embodiment, the delivery surface data object is an ordered list of boundary elements of a delivery surface associated with the geographic address. In one implementation, the boundary elements may be shared between the delivery surface data objects, restricted access surface data objects, or a combination thereof. In another implementation, the boundary element may be modeled as a Non-Rational Bezier Spline, or a Non-Uniform Rational Basis Spline (NURBS) that may be used to represent curves and surfaces. The boundary element may include, but not restricted to, a start geographic point, an end geographic point, one or more control points, a knot vector, or a combination thereof. In one embodiment, the determination of the boundary elements may further cause to incorporate the boundary elements in the delivery surface data objects.

In one embodiment, the processing module 203 may process and/or facilitate a processing of the source data to determine delivery edges of the delivery surfaces. A delivery edge is a preferred side of the delivery surface for placing a delivery package. In one implementation, a delivery edge is determined from the boundary elements associated with the delivery surface data objects. In an implementation, if a delivery edge is not defined for a delivery surface data object, then middle of the delivery surface is determined as a prescribed point of package delivery.

In one embodiment, the delivery surface data object, restricted access surface data object, or a combination thereof may be specified with respect to, geographic point objects. The geographic point objects may be used to define geographic coordinates of the geographic delivery location associated with the geographic address. The geographic point objects may be three-dimensional (3D) points defined by latitude (ranges from 0° at the Equator to 90° (North or South)), longitude (ranges from 180° from the Prime Meridian to +180° eastward and −180° westward), and altitude. In one implementation, the processing module 203 may determine the geographic point objects by using depth maps. In one example embodiment, the delivery surface data object, restricted access surface data object, or a combination thereof may be specified with respect to the geographic point objects referenced according to a fixed world coordinate system. The fixed world coordinate system may be World Geodetic System 84 (WGS84) that may independently define the geographic locations in space without referencing to a postal code associated with the geographic address. By using the fixed world coordinate system, the level of accuracy for measuring the geographic point objects (latitude and/or longitude) may be raise up to seven decimal precision, and the level of accuracy of the geographic point object (altitude) may be raise up to two decimal precision.

In one embodiment, the user interface module 205 may present a Graphical User Interface (GUI) on the user equipment 101. The GUI may receive user inputs from the customer (e.g., owner, tenant, etc.) to select and rank the delivery surface data objects associated with the geographic address. For example, the customer may rank a front porch as rank '1', and rank '2' to the roof, as it is convenient for the customer to collect the package from the front porch. The GUI is explained in conjunction with FIG. 11. In another embodiment, the user interface module 205 may provide the ranks of the delivery surface data objects to the ranking module 207. In another embodiment, the user interface module 205 may be used to delete, add, and edit properties of delivery or restricted access surfaces.

In one embodiment, the ranking module 207 may rank the delivery surface data objects based on the user inputs received from the user interface module 205. In another embodiment, the ranking module 207 may dynamically generate ranks for the delivery surface data objects associated with the geographic address. In one implementation, the ranks for the delivery surface data objects may be generated based on proximity to the entrance of the building associated with the geographic address. In one example embodiment, a rank '1' may be generated for a delivery surface data object of the front porch that is nearest to the entrance of the building associated with the geographic address, and a rank '2' may be generated for the delivery surface data object of the driveway that is farthest from the entrance of the building. In another implementation, the ranks for the delivery surfaces may be generated based on environmental conditions such as, weather, associated with the geographic address. For example, on a rainy day, the ranking module 207 may rank a delivery surface data object of a front porch, a covered area, as rank '1' and the other delivery surface data object of a driveway, an uncovered area, as rank '2', as if the package is delivered at the driveway then it may get damaged due to rain. In yet another implementation, the ranks for the delivery surface data objects may be generated based on crime statistics of a region associated with the geographic address. For example, if crime statistics for a delivery surface data object close to a gate is high then a rank '2' is generated for the delivery surface data object close and rank '1' is generated for a delivery surface data object close to a front door, or in the view of a camera on the building for which the crime statistics is low. The crime statistics data may be available historically from a database, such as the source database 113. In another implementation, the ranks for the delivery surface data objects may be generated based on properties of the package, for example, weight, size, color, content, description (e.g., fragile), and the like, or a combination thereof. In one implementation, the ranks for the delivery surface data objects may be generated based on historical delivery information associated with the geographic address. For example, if the aerial delivery vehicle 119 has previously delivered a package at a front porch of the geographic address then a rank '1' is generated for the delivery surface data object of the front porch and a rank '2' is generated to a delivery surface data object other than the front porch of the geographic address. In a further implementation, the ranks for the delivery surface data objects may be generated based on reviews and customer feedbacks about delivery of a package at a geographic address. For example, the aerial delivery vehicle 119 may rank a delivery surface data object of the walkway as rank '1' and rank '2' to the delivery surface data object of the driveway to deliver the package at the geographic address based on a customer's feedback. In another example, the aerial delivery vehicle 119 may move a previously delivered package from the walkway to the front porch based on the customer's review and feedbacks. In another implementation, the ranks for the delivery surface data objects may be generated based on closeness to a reference object. For example, based on closeness to a front door, a delivery surface data object of a front porch may be ranked '1' as it may be easier for the customer to retrieve the package from the front porch, the walkway ranked '2', and the driveway ranked '3'.

In one embodiment, the encoding module 209 may create a complete delivery data model based on the delivery surface data objects. The complete delivery data model may include, but not restricted to, delivery surface data objects, restricted access surface data objects, ranks of the delivery surface data objects, boundary elements, or a combination thereof. The complete delivery data model may represent a delivery location associated with the geographic or postal address, on which the package may be delivered by the aerial delivery vehicle 119. The complete delivery data model is explained in detail in conjunction with FIG. 10.

In one embodiment, the encoding module 209 may encode the geographic address in the complete delivery data model. The geographic address may be encoded in the complete delivery data model to associate the complete delivery data model with the geographic location. In one implementation, the encoding module 209 may also encode the geographic address in the complete delivery data model to associate the complete delivery data model with link identifiers of a map link in a map database. Link identifiers may represent a geographic address on a map, therefore, may be used to identify roads associated with the geographic address. In one implementation, the complete delivery data model may be associated with a percent distance from a reference node in the map database. The percent distance from a reference node may represent how far the geographic address is located from a reference node such as a landmark, and intersection, etc. In one implementation, the complete delivery data model may be associated with a side of the map link. The side of the map link may represent a side at which the geographic address is located. In another implementation, the complete delivery data model may be associated with a perpendicular distance from the map link. In yet another implementation, the complete delivery data model may be associated with Universal Location Reference (ULR) that represents a link to the delivery location of the geographic address on a map.

In another embodiment, the encoding module 209 may encode delivery information, package information, recipient information, address information, sender information, or a combination thereof in one or more codes associated with the package, the delivery location, the geographic location, or a combination thereof. The delivery information may include, but not restricted to, geographic address of the building, a name of an authorized package recipient, weight of the package, dimensions of the package, a time of package delivery, or a combination thereof. The package information may include, but not restricted to, a weight of the package, dimensions of the package, a name associated with the package, description of the package, a delivery time associated with the package, a package identification number, or a combination thereof. The geographic address information may include, but not restricted to, geographic point objects, delivery location, and the like. The sender information may include, but not restricted to, a name of the sender, an address of the sender, a phone number of the sender, and the like, or a combination thereof. The code may include, but not restricted to, machine-readable optical labels, wireless beacon signals, NFC signals, or a combination thereof. Examples of the codes may include, but not restricted to, Quick Response (QR) codes, bar codes, or any other two dimensional (2D) or three-dimensional (3D) way of graphical representation of information.

Further, the encoding module 209 may transmit the encoded geographic address, the encoded package information, or a combination thereof to the package delivery application 121 of the aerial delivery vehicle 119.

Figure 3:
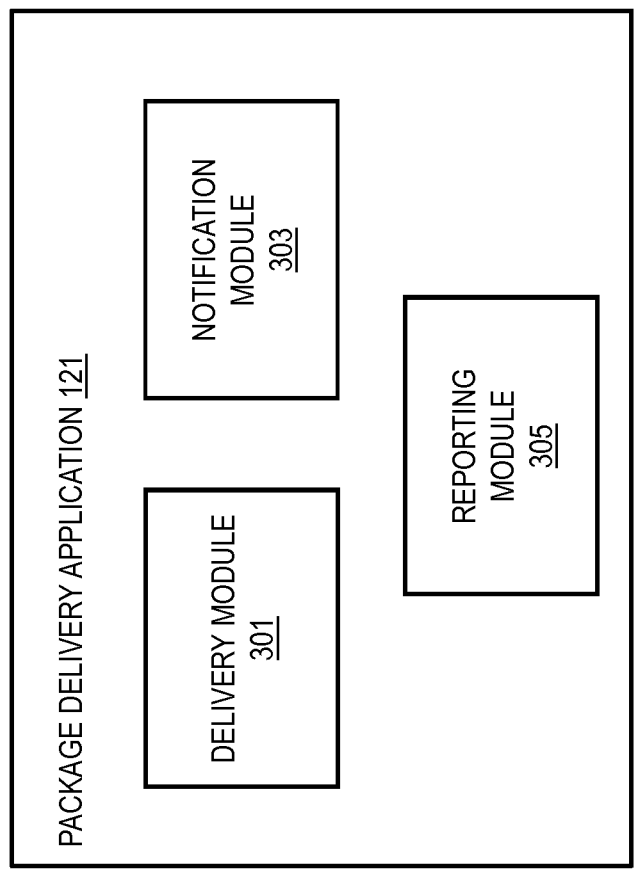
FIG. 3 is a diagram of the components of a package delivery application associated with the aerial delivery vehicle 119, according to one embodiment.

FIG. 3 is a diagram of components of the package delivery application 121, according to one embodiment. By way of example, the package delivery application 121 includes one or more components for delivering the packages to the geographic addresses by the aerial delivery vehicle 119. It is contemplated that the functions of these components may be combined in one or more components or performed by other components of equivalent functionality. In this embodiment, the package delivery application 121 includes a delivery module 301, a notification module 303, and a reporting module 305.

In one embodiment, the delivery module 301 may read the code to determine an aerial delivery route from an inventory to the geographic address. Based on the aerial delivery route, the aerial delivery vehicle 119 may reach to the geographic address and deliver the package. In one implementation, the geographic delivery location associated with the geographic address may have a landing pad on a delivery surface data object upon which the aerial delivery vehicle 119 may deliver the package. In one example embodiment, the landing pad may be placed and/or located at the delivery surface data object on the roof of the building. In another example embodiment, the landing pad may be placed and/or located at the delivery surface data object of the front porch of the building associated with the geographic address. The landing pad may have a code that may provide the delivery instructions to the aerial delivery vehicle 119 at the delivery time. The delivery instructions may include information such as, but not restricted to, geographic address of the building, a name of an authorized package recipient, maximum package weight, maximum package dimensions, a time of package delivery, an image of the package on the delivery surface, geographic coordinates of the delivery surface, or a combination thereof. In one implementation, the delivery module 301 may compare the geographic address on the code of the package with the geographic address on the code of the landing pad to make sure that the package is delivered to a correct geographic address. In another implementation, the delivery module 301 may compare the name on the code of the package with the name on the code on the landing pad to make sure that the package is delivered to an authorized recipient. In another implementation, the delivery module 301 may compare the weight of the package to the maximum package weight of the landing pad to make a decision whether to deliver the package on the landing pad, or to an alternative delivery surface data object. For example, if the package to be delivered is heavier than the maximum weight tolerable by the landing pad, then the aerial delivery vehicle 119 may deliver the package on an alternate delivery surface data object. In another implementation, the delivery module 301 may compare the dimensions of the package to the maximum package dimensions stored in the code on the landing pad to make a decision whether to deliver the package on the landing pad or to an alternative delivery surface data object. In one implementation, the aerial delivery vehicle 119 may record the delivery time of the package before and after reading the code of the landing pad.

In one embodiment, the delivery module 301 may deliver the package at an alternate delivery surface data object associated with the geographic address based on, but not restricted to, the environmental conditions, the crime statistics, the status of the aerial delivery vehicle 119, the delivery package information, the historical delivery information, the customer reviews, or a combination thereof. In one implementation, a sorting module (not shown) may sort packages according to their geographic address and then the delivery module 301 may route each of the packages from the landing pad to their correct geographic address.

In one embodiment, the notification module 303 may generate notifications to notify the customer about the delivery of the package at the delivery location of the geographic address. In one implementation, the notification module 303 may generate notifications before delivering the package at the geographic address. In this case, the notification may include information such as, but not restricted to, a date, a day, and time, chosen delivery surface, or geographic address at which the package is going to be delivered. In another implementation, the notification module 303 may generate notifications after completing delivery of the package at the geographic address. In this case, the notification may include information such as, date, day, time, or delivery surface at which the package was delivered. In one implementation, the notification may be, but not restricted to, a visual alert, a haptic alert, a sound alert, or a combination thereof.

In one embodiment, a reporting module 305 may mark the geographic delivery location of the package delivery. In one implementation, the reporting module 305 may use the sensors such as the sensors 105, to mark an exact geographic delivery location on the delivery surface data object where the package is delivered. In another implementation, the reporting module 305 may take pictures by using a camera to mark an exact geographic delivery location on the delivery surface where the package is delivered. In another embodiment, the reporting module 305 may generate reports having the geographic delivery location and/or the pictures of the geographic delivery location at which the package is delivered. In one embodiment, the reporting module 305 may provide the reports to the customer associated with the package. In one example embodiment, a report having a map on which the geographic delivery location is marked is provided to the customer associated with the package.

In one embodiment, the user may manually collect the delivered package from the landing pad. In another embodiment, the package may be delivered automatically to the geographic address. In one example embodiment, in a multistory building, if a package is delivered on a roof of the building then the package may be routed automatically to a correct geographic address through one or more delivery channels that run from the landing pad to the geographic address.

The above presented modules and components of the delivery platform 117 and the package delivery application 121 may be implemented in hardware, firmware, software, or a combination thereof. In another embodiment, one or more of the modules 201-209 and 301-305 may be implemented for operation by respective the aerial delivery vehicle 119. The various executions presented herein contemplate any and all arrangements and models.

Figure 4A:
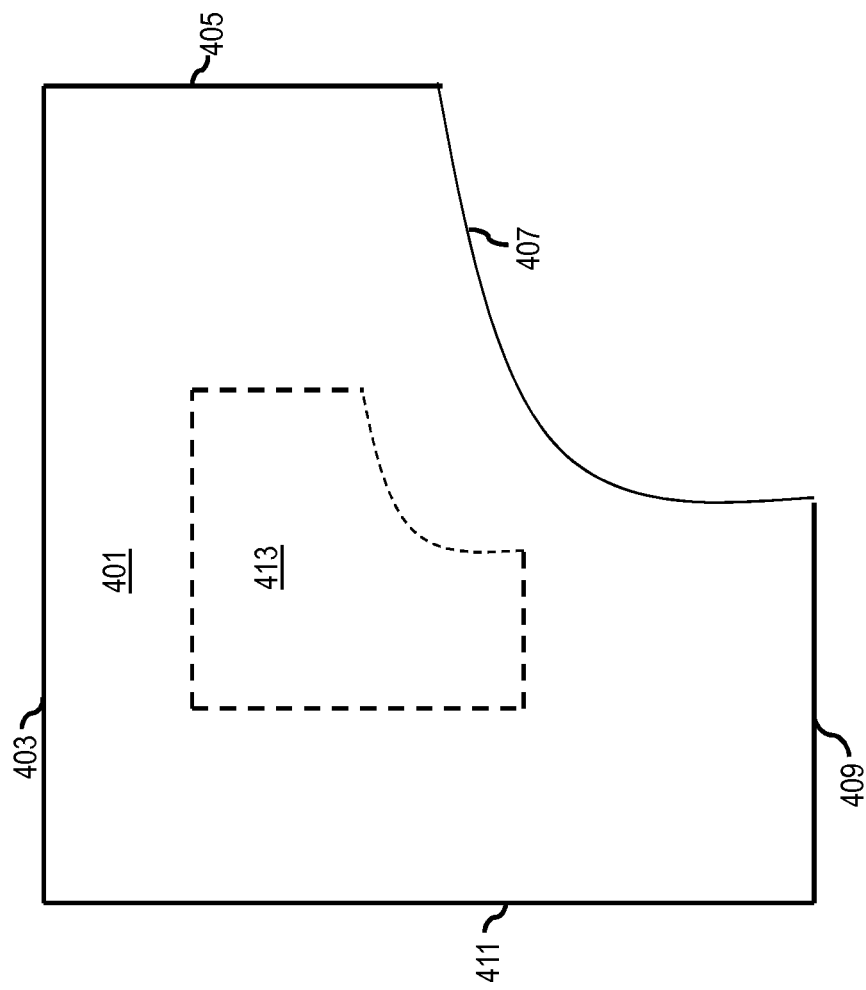
FIGS. 4A-4D are diagrams that represent a delivery surface data object, a boundary element, a restricted access surface data object, a geographic point object, or a combination thereof, according to one embodiment.

FIGS. 4A-4D are diagrams that represent a delivery surface data object, a boundary element, a restricted access surface data object, a geographic point object, or a combination thereof, according to one embodiment. As shown in FIG. 4A, a delivery surface data object 401 may have an outer boundary having a list of boundary elements 'BE-1' [403], 'BE-2' [405], 'BE-3' [407], 'BE-4' [409], and 'BE-5' [411]. Also, the delivery surface data object 401 may have a hole 413.

TABLE 1

```
< deliverySurface name="DS-1" rank="1">
    <!-- The outer boundary - ordered list of boundary elements
    (clockwise) -->
    <boundary>
        <boundaryElement deliveryEdge="T">BE-1
        </boundaryElement>
        <boundaryElement>BE-2</boundaryElement>
        <boundaryElement>BE-3</boundaryElement>
        <boundaryElement>BE-4</boundaryElement>
        <boundaryElement>BE-5</boundaryElement>
        ...
    </boundary>
    <!-- The holes -->
    <holes>
        <boundary>
            ... <!- not enumerated ->
        </boundary>
        ...
    </holes>
</deliverySurface>
```

Table 1 shows an exemplary pseudo code for defining the delivery surface data object 401.

Figure 4B:
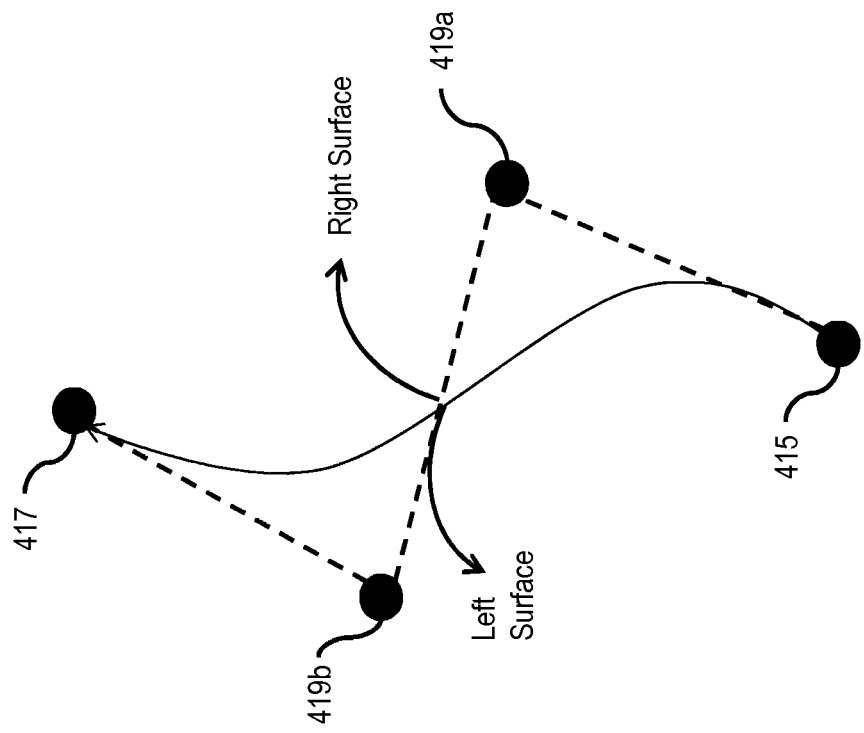

In FIG. 4B, a boundary element of a delivery surface data object is shown that starts at a start geographic point object 415 and ends at an end geographic point object 417. Further, the shape of the delivery surface data object between the geographic point objects 415 and 417 is determined by using a knot vector and a set of control points, in this case, there are two control point 419a and 419b.

TABLE 2

```
<boundaryElement name="BE-1" >
    <curve startPoint= "GP-1" endPoint="GP-2">
        <!-- Control points and knot vectors for NURBS -->
        <controlPoints>
            <controlPoint>GP-3<controlPoint>
            ...
            <controlPoints>
            <knots>
            <knot>...</knot> <!- decimal number ->
            ...
            </knot>
    </curve>
</boundaryElement>
```

Table 2 shows an exemplary pseudo code for defining the boundary element objects.

Figure 4C:
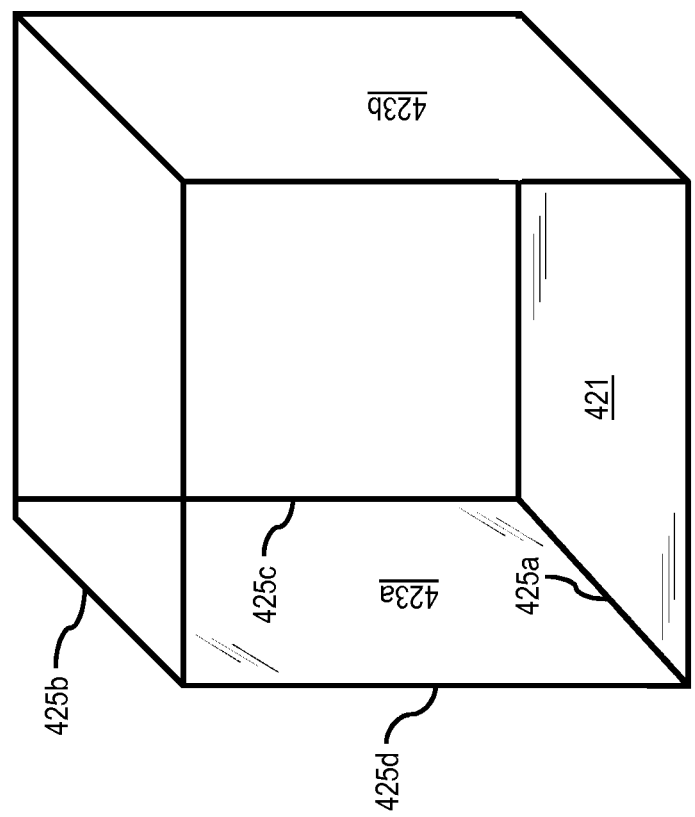

FIG. 4C represents a delivery surface data object 421 and restricted access surface data objects 423a and 423b. The restricted access surface data object 423a has four boundary elements 425a-d.

TABLE 3

```
<restrictedAccessSurface name="RAS-1"> >
    <boundary>
        <boundaryElement>BE-1</boundaryElement>
        <boundaryElement>BE-6</boundaryElement>
        <boundaryElement>BE-7</boundaryElement>
        <boundaryElement>BE-8</boundaryElement>
    </boundary>
</restrictedAccessSurface>
        <restrictedAccessSuface name="RAS-2"> >
    <boundary>
        ...
    </boundary>
</restrictedAccessSurface>
```

Table 3 shows an exemplary pseudo code for defining restricted access surface data objects and delivery surface data objects.

Figure 4D:
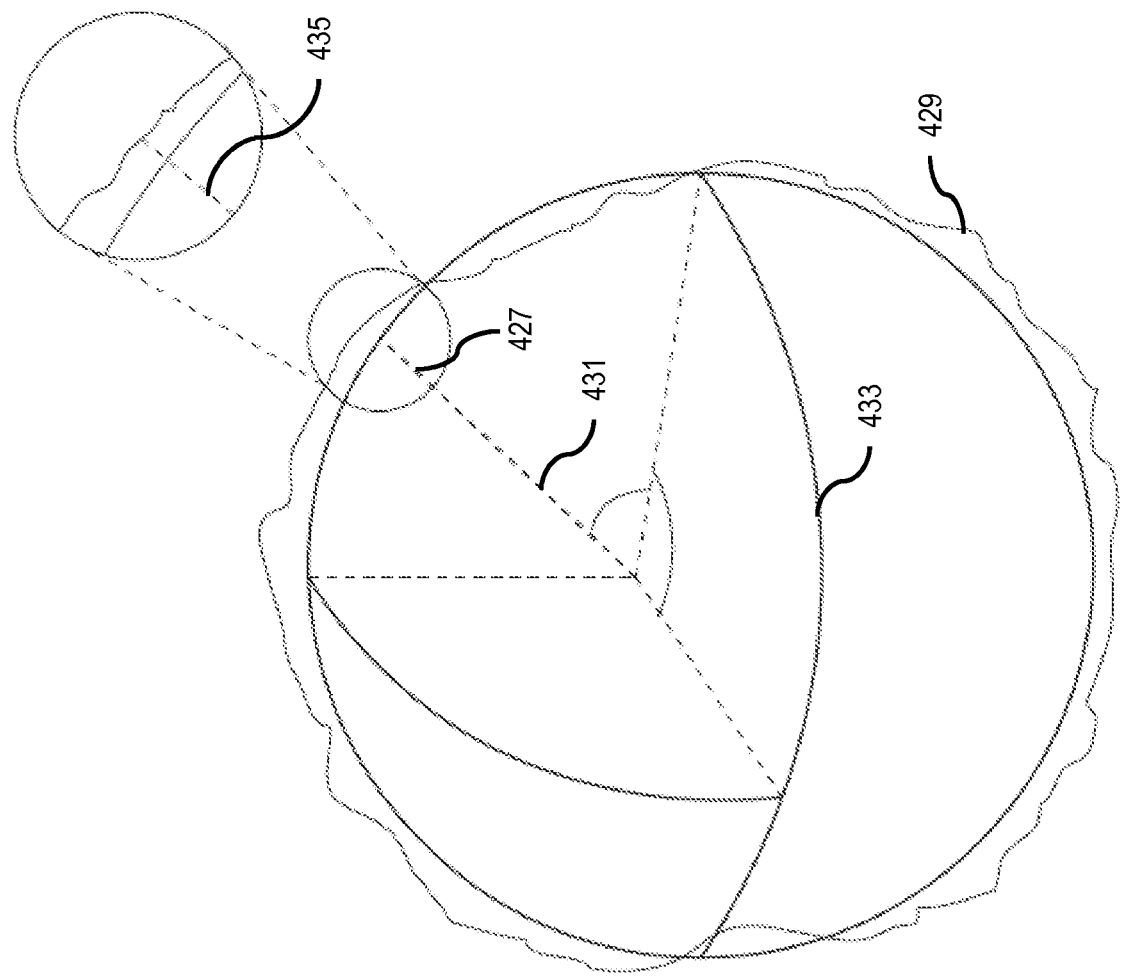

FIG. 4D is a diagram for determining geographic coordinates of a geographic point 427 based on a geoid 429 that is a model of global mean sea level that may be used to precisely measure surface elevations.

TABLE 4

```
<deliveryModel>
    <postalAddress ... />
    ... <!- other dwelling identifers ->
    <geometricPoints>
        <geometricPoint name="GP-1" /> ...
    </geometricPoints>
    <boundaryElements>
        <boundaryElement name="BE-1"/> <!- shared ->
        <boundaryElement name="BE-2"/> ...
    </boundaryElements>
    <deliverySurfaces>
        <deliverySurface name="DS-1" rank="1">
            <boundary>
                <boundaryElement>BE-1</boundaryElement> ...
                ...
            </boundary>
        <deliverySurface name="DS-2 rank="2"/> ...
    </deliverySurfaces>
        <restrictedAccessSurfaces>
    <deliverySurface name="RAS-1">
        <boundary>
            <boundaryElement>BE-1</boundaryElement>        ...
        </boundary>
    <deliverySurface>
    <deliverySurface name="RAS-2">
        ...
```

TABLE 4-continued

```
            <deliverySurface>
        </restrictedAccessSurfaces>
    </deliveryModel>
```

Table 4 shows an exemplary pseudo code of a complete delivery data model.

The geographic coordinates of the geographic point 427 may be determined as, for example, latitude [431] is 41.3213456°, longitude [433] is −88.7487483°, and the altitude [435] is 4.88 meters. In one implementation, the values of the geographic points are floating numbers.

Figure 5:
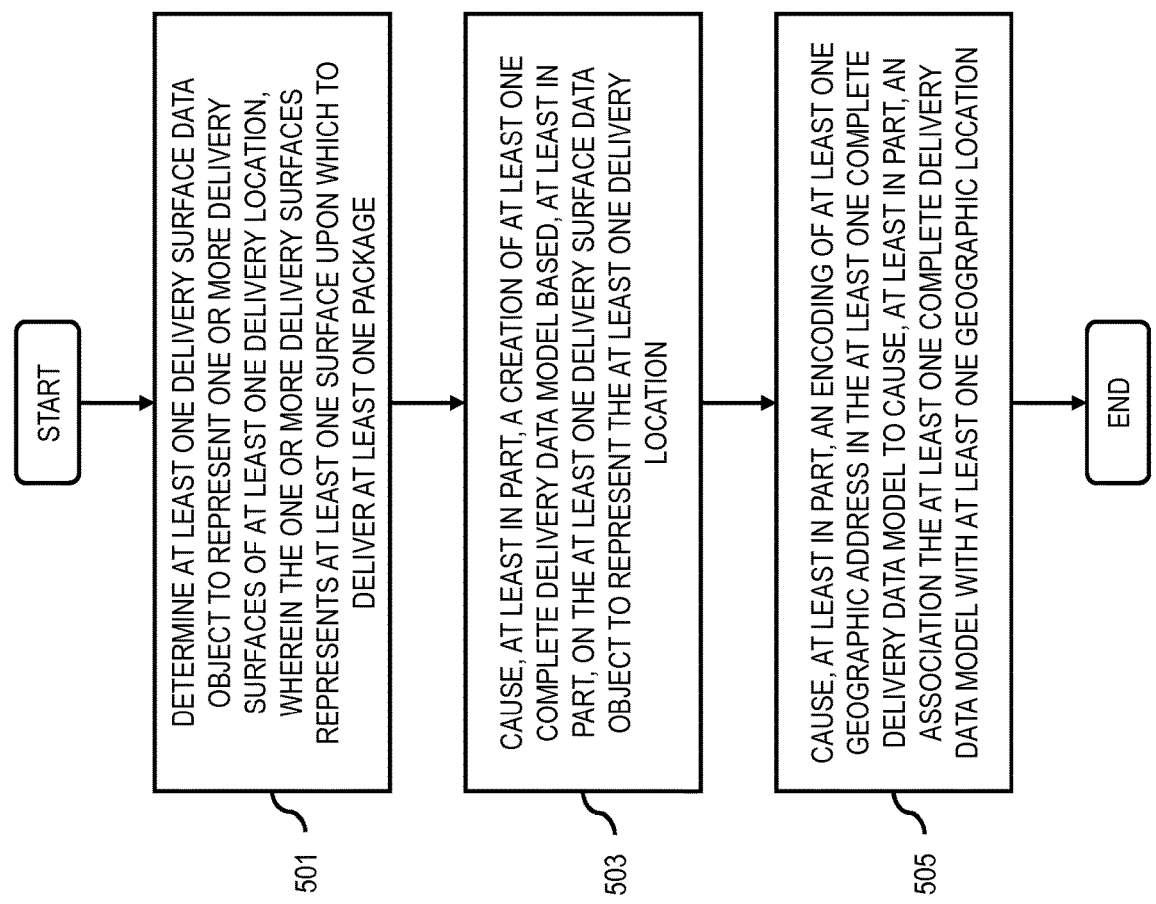
FIG. 5 is a flowchart of a process for encoding a geographic address with a delivery data model, according to one embodiment.
Figure 14:
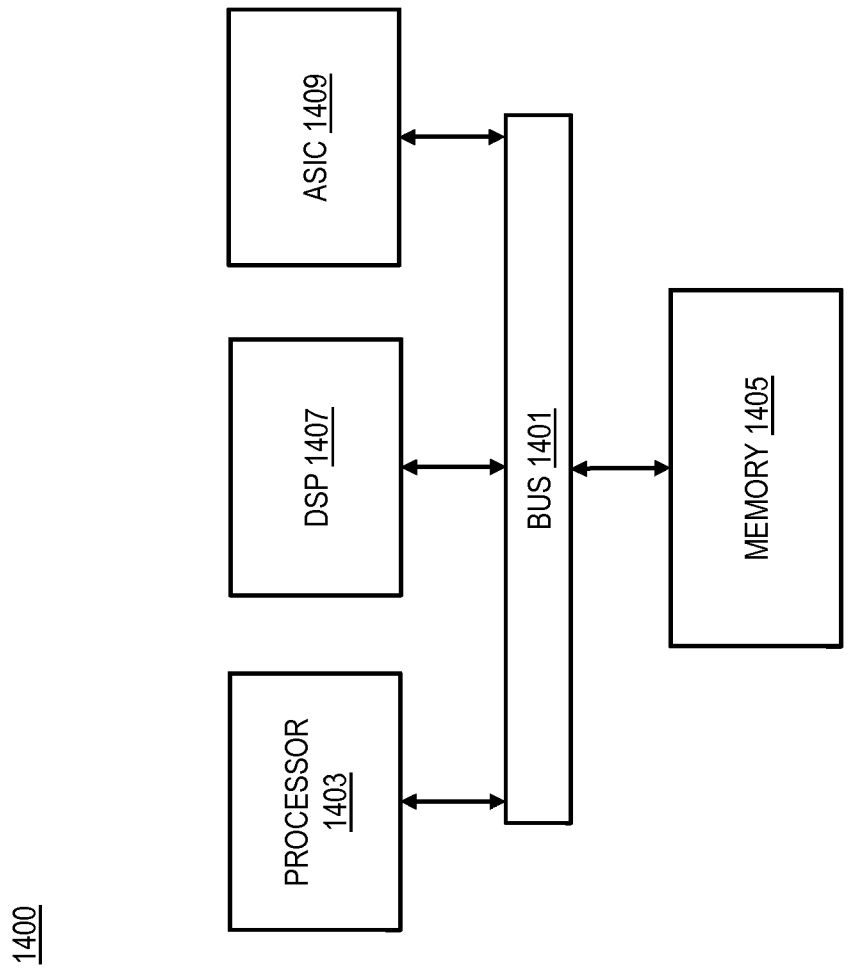
FIG. 14 is a diagram of a chip set that can be used to implement an embodiment of the invention.

FIG. 5 is a flowchart of a process 500 for encoding a geographic address with a delivery data model, according to one embodiment. In one embodiment, the delivery platform 117 performs the process 500 and may be implemented in, for instance, a chip set including a processor and a memory as shown in FIG. 14.

In step 501, the delivery platform 117 determines delivery surface data objects to represent delivery surfaces of a delivery location associated with a geographic address. A delivery surface is a surface upon which a package may be delivered by the aerial delivery vehicle 119. In one example embodiment, the delivery surface may be, but not restricted to, a three-dimensional horizontal surface that may comprise three-dimensional splines.

In step 503, the delivery platform 117 create delivery data models based on the delivery surface data objects to represent the delivery location. The complete delivery data model may include, but not restricted to, delivery surface data objects, restricted access surface data objects, ranks of the delivery surface data objects, boundary elements, or a combination thereof. The complete delivery data model may represent a delivery location associated with the geographic address, on which the package may be delivered by the aerial delivery vehicle 119

Next, in step 505, the delivery platform 117 encodes the geographic address in the complete delivery data model. The geographic address may be encoded in the complete delivery data model to associate the complete delivery data model with the geographic location. In one implementation, the delivery platform 117 may also encode the geographic address in the complete delivery data model to associate the complete delivery data model with, but not restricted to, a link identifier of a map link in a map database, a percent distance from a reference node in the map database, a side of the map link, a perpendicular distance from the map link, a Universal Location Reference (ULR), and the like or a combination thereof.

Figure 6:
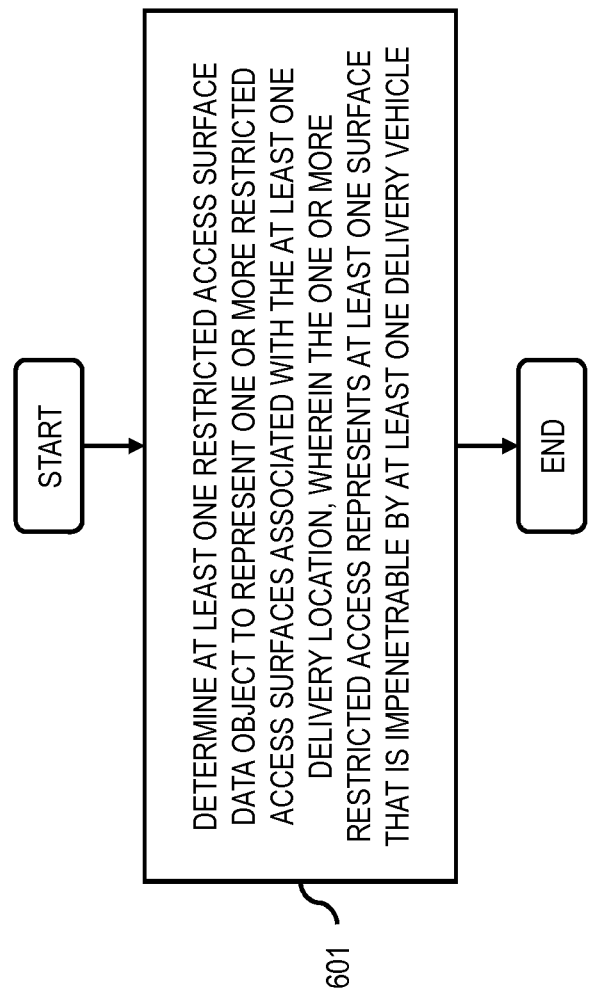
FIG. 6 is a flowchart of a process for determining a restricted access surface data object, according to one embodiment.

FIG. 6 is a flowchart of a process 600 for determining restricted access surface data objects, according to one embodiment. In one embodiment, the delivery platform 117 performs the process 600 and may be implemented in, for instance, a chip set including a processor and a memory as shown in FIG. 14.

In step 601, the delivery platform 117 determines the restricted access surface data object to represent one or more restricted access surfaces associated with the at least one delivery location. The restricted access surface data object may represent restricted access surfaces of the delivery location associated with the geographic address. As previously noted, a restricted access surface is a surface surrounding the delivery surface, which may be impenetrable by the aerial delivery vehicle 119. In one embodiment, delivery of a delivery package by the aerial delivery vehicle 119 is restricted on the restricted access surfaces.

Figure 7:
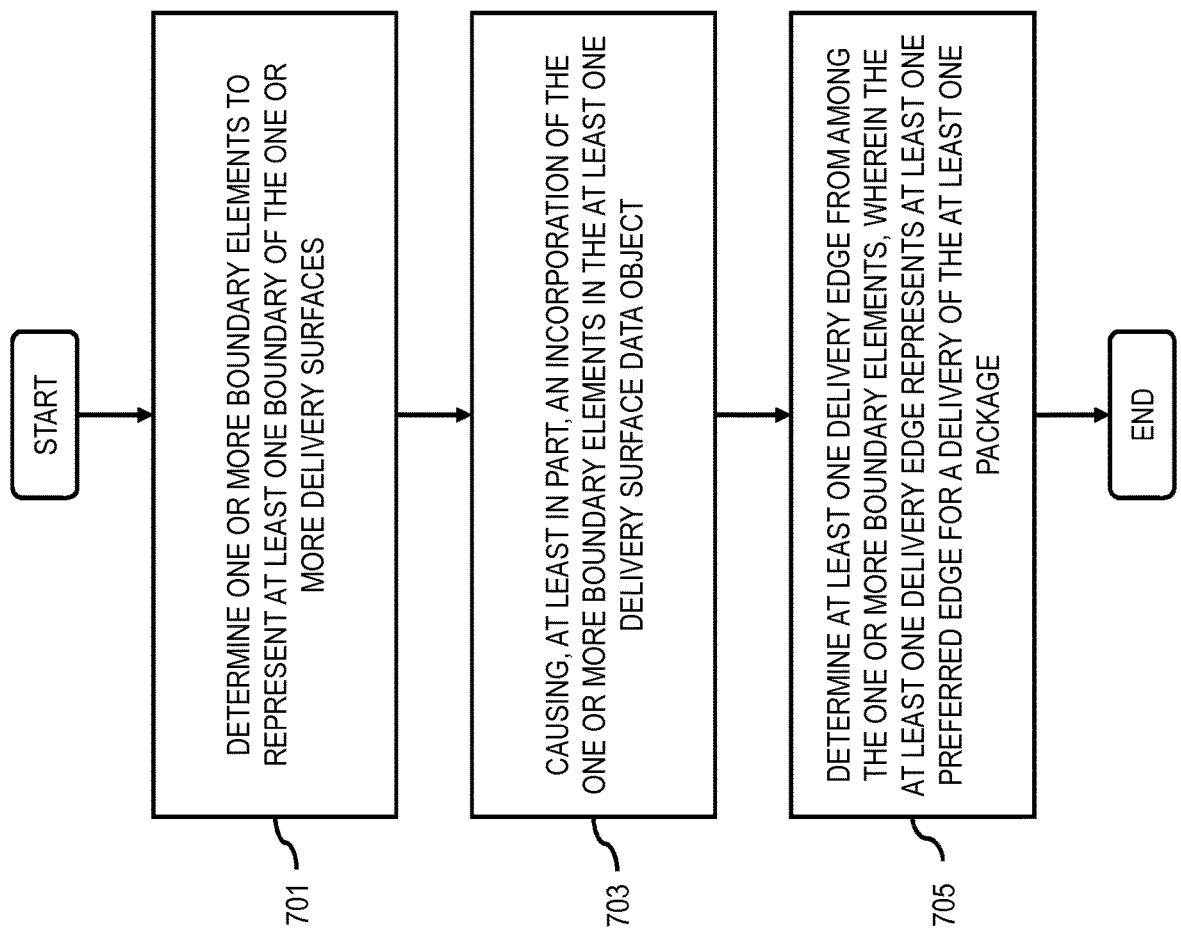
FIG. 7 is a flowchart of a process for determining boundary elements and/or delivery edges associated with the geographic address, according to one embodiment.

FIG. 7 is a flowchart of a process 700 for determining boundary elements and/or delivery edges associated with the geographic address, according to one embodiment. In one embodiment, the delivery platform 117 performs the process 700 and may be implemented in, for instance, a chip set including a processor and a memory as shown in FIG. 14.

In step 701, the delivery platform 117 determines boundary elements of the delivery surface data objects. The boundary elements represent boundaries of the delivery surface data object. In one example embodiment, the delivery surface data object is an ordered list of boundary elements of a delivery surface associated with the geographic address.

Further, in step 703, the delivery platform 117 determination of the boundary elements may cause to incorporate the boundary elements in the delivery surface data object.

In step 705, the delivery platform 117 determines delivery edges from the boundary elements. In one implementation, a delivery edge is determined from the boundary elements associated with the delivery surface data objects. In an implementation, if a delivery edge is not defined for a delivery surface data object, then middle of the delivery surface is determined as a prescribed point of package delivery.

Figure 8:
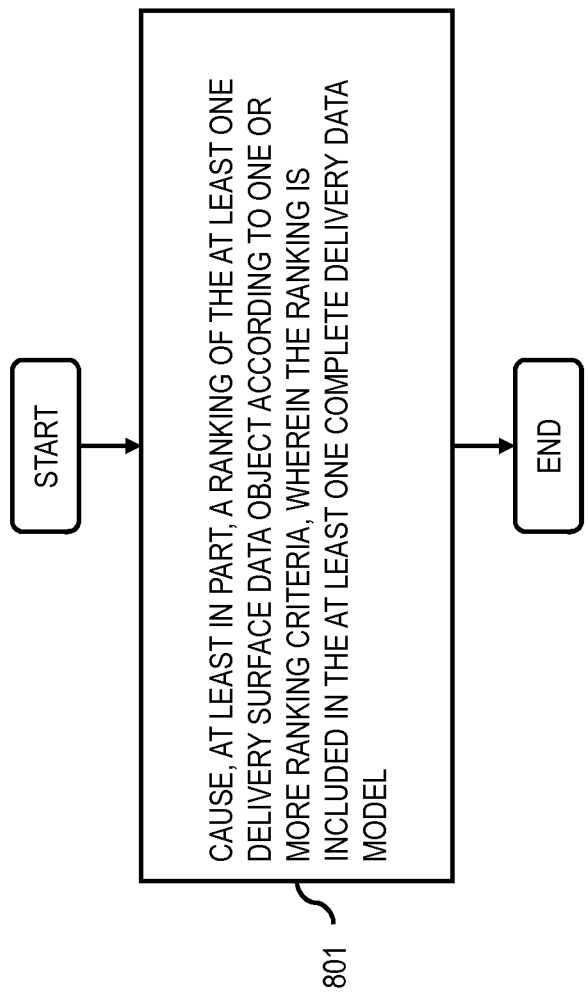
FIG. 8 is a flowchart of a process for ranking delivery surface data objects, according to one embodiment.

FIG. 8 is a flowchart of a process 800 for ranking the delivery surface data objects, according to one embodiment. In one embodiment, the delivery platform 117 performs the process 800 and is implemented in, for instance, a chip set including a processor and a memory as shown in FIG. 14.

In step 801, the delivery platform 117 ranks the delivery surface data objects based on ranking criteria. As previously noted, the ranking criteria may include, but not restricted to, a proximity to entrances associated with the geographic address, UAV status (e.g. size, charge remaining), environmental conditions associated with the geographic address, environmental conditions associated with delivery route, crime statistics associated with the geographic address, a status of an aerial delivery vehicle, delivery package information, historical delivery information, one or more customer review, a user input, and the like or a combination thereof. For example, the customer may rank a delivery surface data object of the roof as rank '1' and rank a delivery surface data object of the walkway as rank '2'. Then, delivery surface data objects may be selected for delivering the package at a geographic address based, at least in part, on the ranking. As in the above example, the delivery surface data object of the roof is selected to deliver the package at the geographic address.

Figure 9:
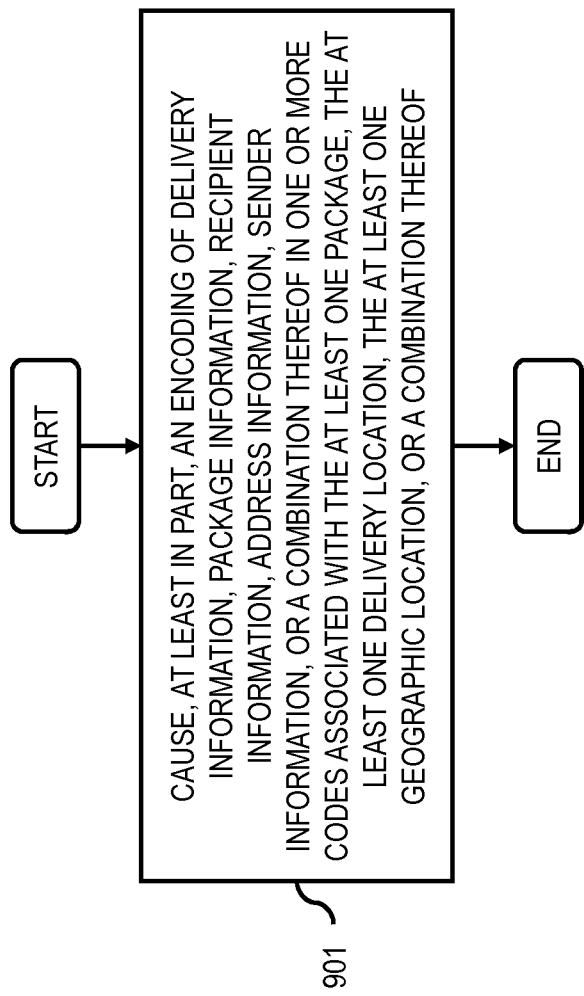
FIG. 9 is a flowchart of a process for encoding information associated with a package and/or delivery location and/or a geographic location, according to one embodiment.

FIG. 9 is a flowchart of a process 900 for encoding information associated with a package and/or delivery location and/or a geographic location, according to one embodiment. In one embodiment, the delivery platform 117 performs the process 900 and is implemented in, for instance, a chip set including a processor and a memory as shown in FIG. 14.

In step 901, the delivery platform 117 encodes delivery information, package information, recipient information, address information, sender information, or a combination thereof in codes associated with the package, the delivery location, the geographic location, or a combination thereof. The code may include, but is not restricted to, machine-readable optical labels, wireless beacon signals, NFC signals, or a combination thereof. Examples of the codes may include, but is not restricted to, Quick Response (QR) codes, bar codes, or any other two dimensional (2D) or three-dimensional (3D) way of graphical representation of information. These codes are made available for reading by an aerial delivery vehicle capable of delivering a package and/or accepting a package for delivery. In one embodiment, the aerial delivery vehicle 119 determines whether the package is being delivered at a correct geographic address based, at least in part, on the encoded information. In one embodiment, the delivery location includes a landing pad for the aerial delivery vehicle.

Figure 10:
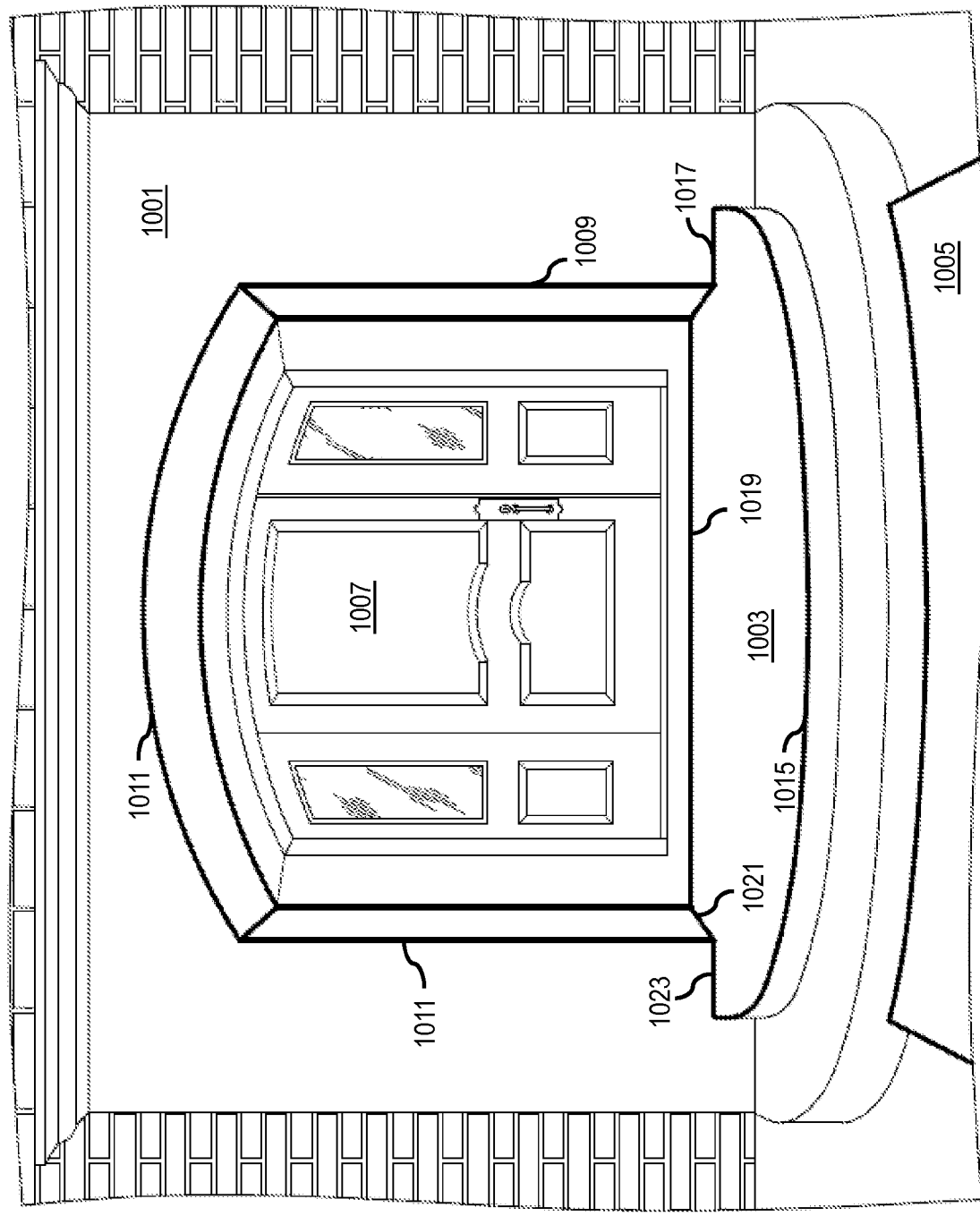
FIG. 10 is a diagram that represents delivery surfaces data objects and/or delivery edges and/or restricted area surface data objects and/or boundary elements associated with the geographic address, according to one example embodiment.

FIG. 10 is a diagram that represents delivery surfaces data objects and/or delivery edges and/or restricted area surface data objects and/or boundary elements associated with the geographic address, according to one embodiment. Source data associated with a building 1001 is determined. The source data is then processed to determine a delivery surface data object 1003 of a porch and a delivery surface data object 1005 of a walkway. The source data is further processed to determine restricted access surface data objects such as a door 'RAS-1' [1007], a side wall 'RAS-2' [1009], a roof 'RAS-3' [1011], and a side wall 'RAS-4' [1013], and boundary elements such as, 'BE-1' [1015], 'BE-2' [1017], 'BE-3' [1019], 'BE-4' [1021], and 'BE-5' [1023]. The delivery surface data objects 1003 and 1005 are then ranked. In this example embodiment, there are two delivery surface data objects, the delivery surface data object 1003 is ranked '1' and the delivery surface data object 1005 is ranked '2'. In one example embodiment, the restricted access surface data objects are not ranked. Further, information associated with the geographic delivery location is retrieved and is encoded to generate a complete delivery data model. As previously noted, the encoding module 209 of the delivery platform 117 generates the complete delivery data model. The encoded complete delivery data model is then transmitted to the aerial delivery vehicle 119 to deliver the package at a delivery location of the geographic address based on the complete delivery data model.

TABLE 5

```
<deliveryModel>
    <postalAddress ... />
    ... <!- other dwelling identifers ->
    <geometricPoints>
            <geometricPoint name="GP-1" /> ...
    </geometricPoints>
    <boundaryElements>
            <boundaryElement name="BE-1"/> <!- shared ->
            <boundaryElement name="BE-2"/> ...
    </boundaryElements>
    <deliverySurfaces>
        <deliverySurface name="DS-1" rank="1">
            <boundary>
    <boundaryElement>BE-1</boundaryElement> ...
            ...
            </boundary>
        <deliverySurface name="DS-2 rank="2"/> ...
    </deliverySurfaces>
            <restrictedAccessSurfaces>
    <deliverySurface name="RAS-1">
        <boundary>
            <boundaryElement>BE-1</boundaryElement>      ...
        </boundary>
    </deliverySurface>
    <deliverySurface name="RAS-2">
        ...
    </deliverySurface>
    </restrictedAccessSurfaces>
</deliveryModel>
```

Table 5 shows an exemplary pseudo code of a complete delivery data model that is associated with a postal address.

Figure 11:
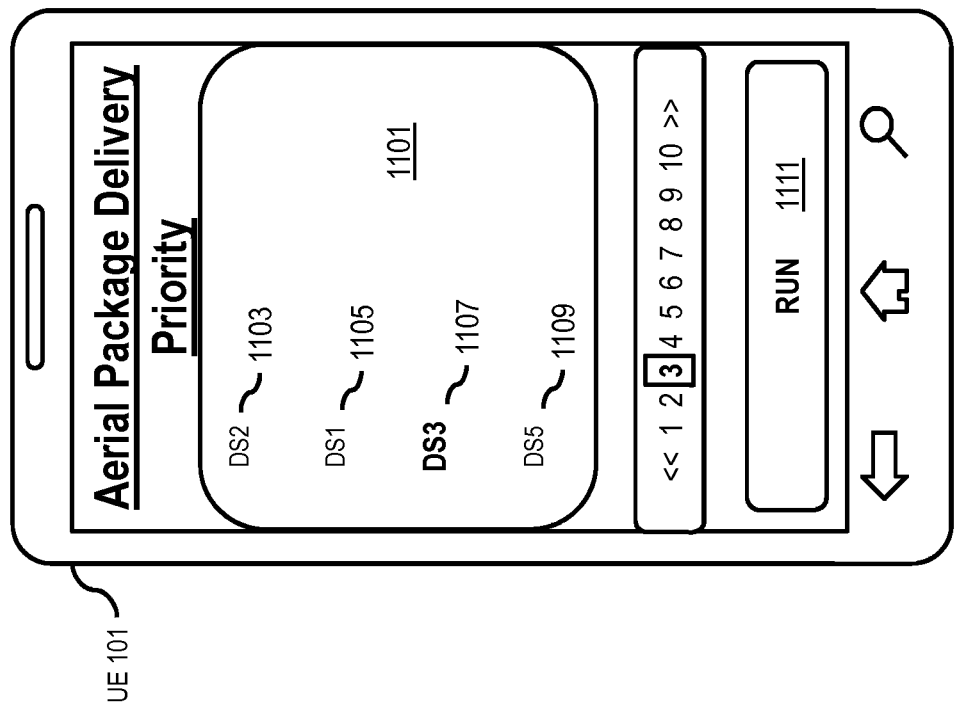
FIG. 11 is a diagram of a Graphical User Interface (GUI) to rank delivery surface data objects, according to one example embodiment.

FIG. 11 is a diagram that represents a GUI 1101 of the UE 101 to rank delivery surface data objects associated with a geographic address. In one example embodiment, a house owner or a tenant may manually configure and edit ranks of the delivery surface data objects by using the GUI 1101. As shown, the owner may rank a delivery surface data object '2' [1103] of a porch as rank '1', a delivery surface data object '1' [1105] of a walkway as rank '2', a delivery surface data object '3' [1107] of a driveway as rank '3', and a delivery surface data object '5' [1109] of a roof as rank '4'. Further, the owner may click on a 'run' button 1111 to run the package delivery application 121 on the user equipment 101. Based on the customer's ranking, complete delivery data model for the geographic address is created, which is then transmitted to the aerial delivery vehicle 119. The aerial delivery vehicle 119 generates aerial delivery route to deliver a package at the delivery location associated with the geographic address. For example, a grandmother with walking challenges prefers the package be delivered on the delivery surface data object '2' [1103] that is closest to the front door. Then the aerial delivery vehicle 119 may attempt to deliver the package at the delivery surface data object '2' [1103]. However, in case, an obstacle such as, a dog is sleeping on the delivery surface data object '2' [1103] then the aerial delivery vehicle 119 may deliver the package at the delivery surface data object '1' [1105].

Figure 12:
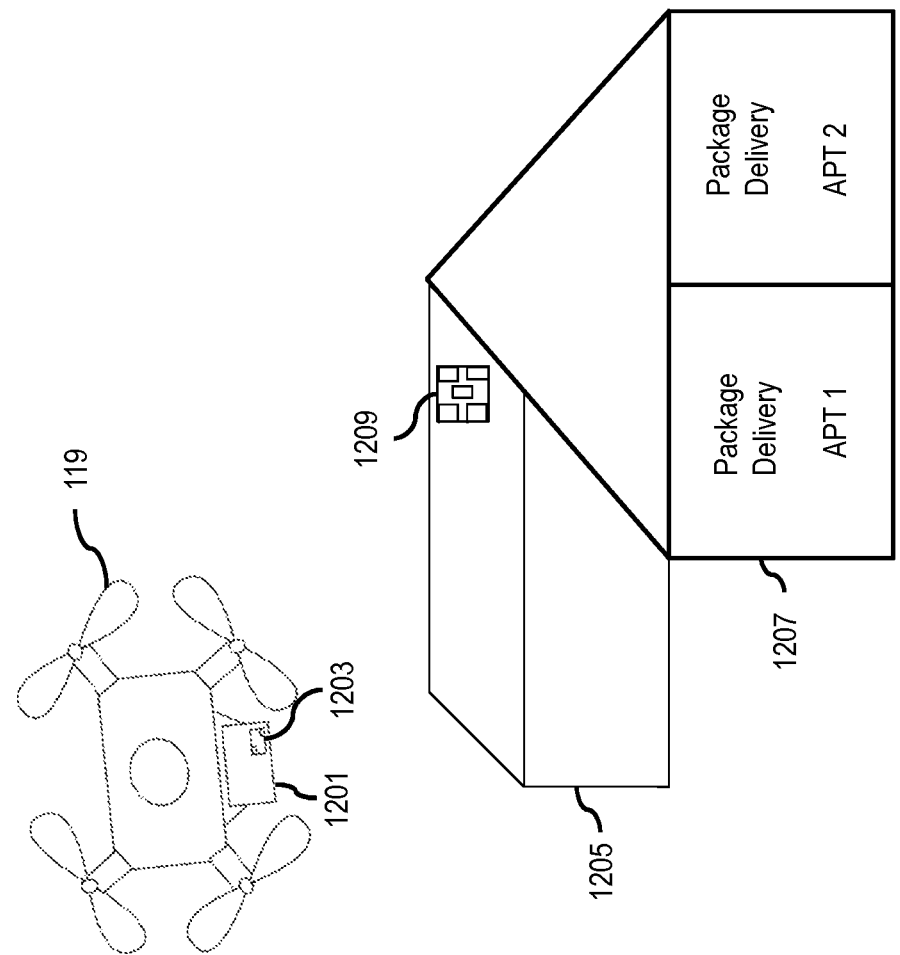
FIG. 12 is a diagram of the aerial delivery vehicle having a package to be delivered on a landing pad, according to one example embodiment.

FIG. 12 is a diagram of the aerial delivery vehicle 119 having a package 1201 to be delivered at the geographic address, according to one example embodiment. The package 1201 to be delivered by the aerial delivery vehicle 119 includes a code 1203 such as a QR code that encodes package information. The package information includes, but is not restricted to, weight of the package, dimensions of the package, an address that the package will be delivered to, a name of the person that the package is addressed to, a description of the package such as fragile or not. The aerial delivery vehicle 119 reads the code 1203 of the package at package 'pick-up' time in an inventory and save the package information into a memory of the aerial delivery vehicle 119.

Further, the aerial delivery vehicle 119 detects a landing pad 1207 on a building 1209 in order to deliver the package 1203. As shown, the landing pad 1207 is placed on a roof of the building 1209 such as, a multistory building with apartment 1 and apartment 2. The landing pad 1207 has a code 1209 that includes encoded delivery information associated with the delivery time. The delivery information may include information such as, but not restricted to, geographic address of the building, a name of an authorized package recipient, maximum package weight, maximum package dimensions, a time of package delivery, an image of the package on the delivery surface, geographic coordinates of the delivery surface, or a combination thereof. The aerial delivery vehicle 119 handshakes with the landing pad 1207 and then the code 1209 on the landing pad 1207 provides delivery information to the aerial delivery vehicle 119. The aerial delivery vehicle 119 compares the delivery information on the code of the package 1201 with the delivery information on the code 1209 of the landing pad 1207. If the delivery information matches of the codes 1203 and 1209, then the aerial delivery vehicle 119 may deliver the package 1201 on the landing pad 1207 of the building 1209. In case, the delivery information does not match, then the aerial delivery vehicle 119 may calculate a route to the correct geographic address.

The processes described herein for generating complete delivery data models for aerial delivery vehicles may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 13:
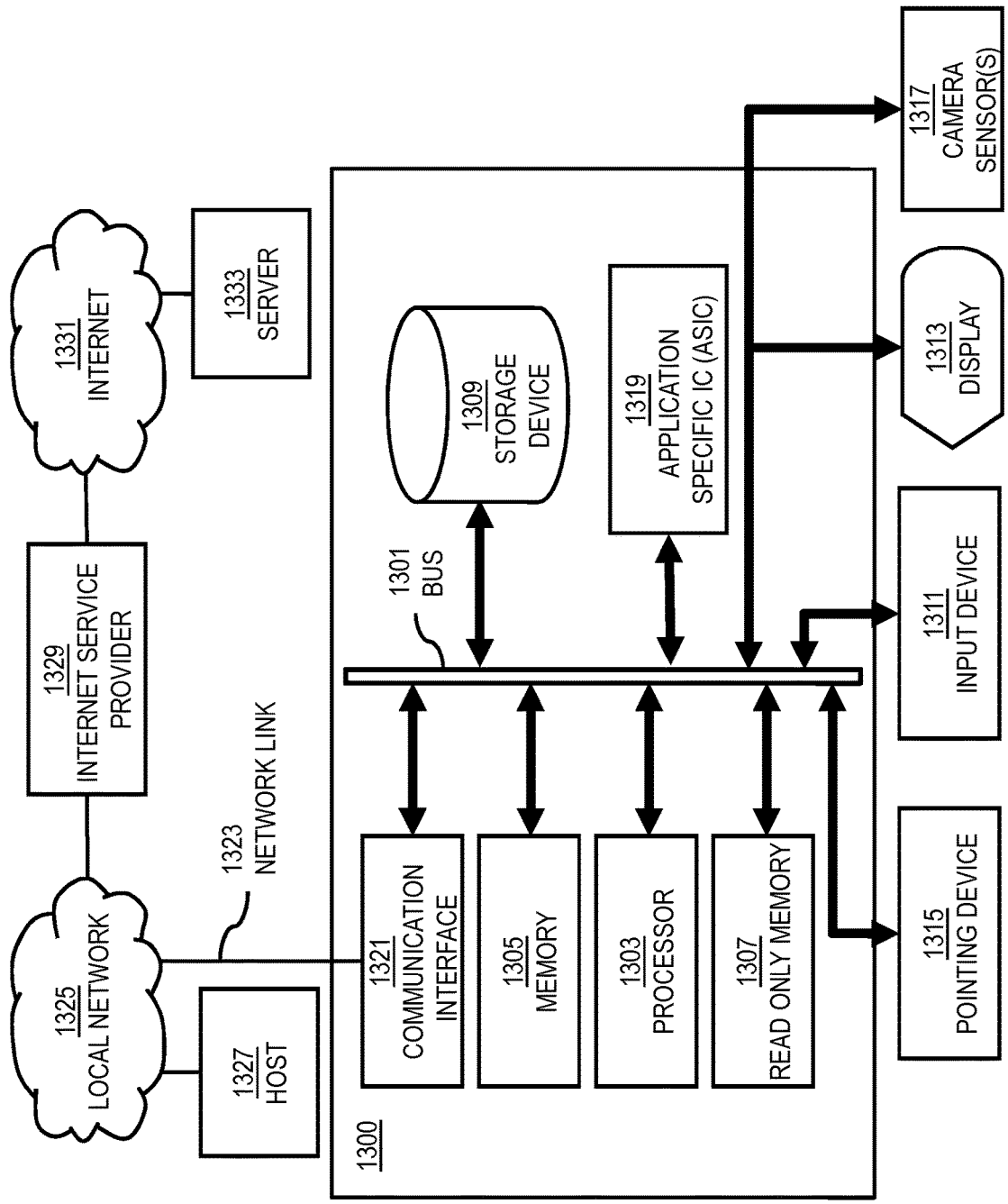
FIG. 13 is a diagram of hardware that can be used to implement an embodiment of the invention.

FIG. 13 illustrates a computer system 1300 upon which an embodiment of the invention may be implemented. Although computer system 1300 is depicted with respect to a particular device or equipment, it is contemplated that other devices or equipment (e.g., network elements, servers, etc.) within FIG. 13 can deploy the illustrated hardware and components of system. The computer system 1300 is programmed (e.g., via computer program code or instructions) to generate complete delivery data models for aerial delivery vehicle described herein and includes a communication mechanism such as a bus 1301 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. The computer system 1300, or a portion thereof, constitutes a means for performing one or more steps for generating complete delivery data models for aerial delivery vehicles.

A bus 1301 includes one or more parallel conductors of information so that information is transferred quickly among devices coupled to the bus 1301. One or more processors 1303 for processing information are coupled with the bus 1301.

The processor (or multiple processors) 1303 performs a set of operations on information as specified by computer program code related to generate complete delivery data models for aerial delivery vehicles. The computer program code is a set of instructions or statements providing instructions for the operation of the processor 1303 and/or the computer system 1300 to perform specified functions. The code, for example, may be written in a computer programming language that is compiled into a native instruction set of the processor 1303. The code may also be written directly using the native instruction set (e.g., machine language). The set of operations include bringing information in from the bus 1301 and placing information on the bus 1301. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1303, such as a sequence of operation codes, constitute processor instructions, also called computer system instructions or, simply, computer instructions. The processors 1303 may be implemented as mechanical, electrical, magnetic, optical, chemical, or quantum components, among others, alone or in combination. The computer system 1300 also includes a memory 1305 coupled to the bus 1301. The memory 1305, such as a Random Access Memory (RAM) or any other dynamic storage device, stores information including processor instructions for storing information and instructions to be executed by the processor 1303. The dynamic memory 1305 allows information stored therein to be changed by the computer system 1300. RAM allows a unit of information stored at a location called a memory address to be stored and retrieved independently of information at neighboring addresses. The memory 1305 is also used by the processor 1303 to store temporary values during execution of processor instructions. The computer system 1300 also includes a Read Only Memory (ROM) 1307 or any other static storage device coupled to the bus 1301 for storing static information, including instructions, that is not changed by the computer system 1300. Some memory is composed of volatile storage that loses the information stored thereon when power is lost. Also coupled to the bus 1301 is a non-volatile (persistent) storage device 1309, such as a magnetic disk, a solid state disk, optical disk or flash card, for storing information, including instructions, that persists even when the computer system 1300 is turned off or otherwise loses power.

Information, including instructions for generating complete delivery data models for aerial delivery package, is provided to the bus 1301 for use by the processor 1303 from an external input device 1311, such as a keyboard containing alphanumeric keys operated by a human user, a microphone, an Infrared (IR) remote control, a joystick, a game pad, a stylus pen, a touch screen, or a sensor. The sensor detects conditions in its vicinity and transforms those detections into physical expression compatible with the measurable phenomenon used to represent information in computer system 1300. Other external devices coupled to the bus 1301, used primarily for interacting with humans, include a display 1313, such as a Cathode Ray Tube (CRT), a Liquid Crystal Display (LCD), a Light Emitting Diode (LED) display, an organic LED (OLED) display, active matrix display, Electrophoretic Display (EPD), a plasma screen, or a printer for presenting text or images, and a pointing device 1315, such as a mouse, a trackball, cursor direction keys, or a motion sensor, for controlling a position of a small cursor image presented on the display 1313 and issuing commands associated with graphical elements presented on the display 1313, and one or more camera sensors 1317 for capturing, recording and causing to store one or more still and/or moving images (e.g., videos, movies, etc.) which also may comprise audio recordings. Further, the display 1313 may be a touch enabled display such as capacitive or resistive screen. In some embodiments, for example, in embodiments in which the computer system 1300 performs all functions automatically without human input, one or more of the external input device 1311, the display device 1313 and the pointing device 1315 may be omitted.

In the illustrated embodiment, special purpose hardware, such as an Application Specific Integrated Circuit (ASIC) 1319, is coupled to the bus 1301. The special purpose hardware is configured to perform operations not performed by the processor 1303 quickly enough for special purposes. Examples of ASICs include graphics accelerator cards for generating images for the display 1313, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 1300 also includes one or more instances of a communication interface 1321 coupled to the bus 1301. The communication interface 1321 provides a one-way or two-way communication coupling to a variety of external devices that operate with their own processors, such as printers, scanners and external disks. In general, the coupling is with a network link 1323 that is connected to a local network 1325 to which a variety of external devices with their own processors are connected. For example, the communication interface 1321 may be a parallel port or a serial port or a Universal Serial Bus (USB) port on a personal computer. In some embodiments, the communication interface 1321 is an Integrated Services Digital Network (ISDN) card, a Digital Subscriber Line (DSL) card, or a telephone modem that provides an information communication connection to a corresponding type of telephone line. In some embodiments, the communication interface 1321 is a cable modem that converts signals on the bus 1301 into signals for a communication connection over a coaxial cable or into optical signals for a communication connection over a fiber optic cable. As another example, the communications interface 1321 may be a Local Area Network (LAN) card to provide a data communication connection to a compatible LAN, such as Ethernet™ or an Asynchronous Transfer Mode (ATM) network. In one embodiment, wireless links may also be implemented. For wireless links, the communication interface 1321 sends or receives or both sends and receives electrical, acoustic or electromagnetic signals, including infrared and optical signals that carry information streams, such as digital data. For example, in wireless handheld devices, such as mobile telephones like cell phones, the communication interface 1321 includes a radio band electromagnetic transmitter and receiver called a radio transceiver. In certain embodiments, the communication interface 1321 enables connection to the communication network 107 for generating complete delivery data models for aerial delivery vehicles. Further, the communication interface 1321 can include peripheral interface devices, such as a thunderbolt interface, a Personal Computer Memory Card International Association (PCMCIA) interface, etc. Although a single communication interface 1321 is depicted, multiple communication interfaces can also be employed.

The term "computer-readable medium" as used herein refers to any medium that participates in providing information to the processor 1303, including instructions for execution. Such a medium may take many forms, including, but not limited to, computer-readable storage medium (e.g., non-volatile media, volatile media), and transmission media. Non-transitory media, such as non-volatile media, include, for example, optical or magnetic disks, such as the storage device 1309. Volatile media include, for example, the dynamic memory 1305. Transmission media include, for example, twisted pair cables, coaxial cables, copper wire, fiber optic cables, and carrier waves that travel through space without wires or cables, such as acoustic waves, optical or electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a USB flash drive, a Blu-ray disk, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1319.

The network link 1323 typically provides information communication using transmission media through one or more networks to other devices that use or process the information. For example, the network link 1323 may provide a connection through the local network 1325 to a host computer 1327 or to ISP equipment 1329 operated by an Internet Service Provider (ISP). The ISP equipment 1329 in turn provides data communication services through the public, world-wide packet-switching communication network of networks now commonly referred to as the Internet 1331.

A computer called a server host 1333 connected to the Internet 1331 hosts a process that provides a service in response to information received over the Internet 1331. For example, the server host 1333 hosts a process that provides information representing video data for presentation at the display 1313. It is contemplated that the components of the computer system 1300 can be deployed in various configurations within other computer systems, e.g., the host 1327 and the server 1333.

At least some embodiments of the invention are related to the use of the computer system 1300 for implementing some or all of the techniques described herein. According to one embodiment of the invention, those techniques are performed by the computer system 1300 in response to the processor 1303 executing one or more sequences of one or more processor instructions contained in the memory 1305. Such instructions, also called computer instructions, software and program code, may be read into the memory 1305 from another computer-readable medium such as the storage device 1309 or the network link 1323. Execution of the sequences of instructions contained in the memory 1305 causes the processor 1303 to perform one or more of the method steps described herein. In alternative embodiments, hardware, such as the ASIC 1319, may be used in place of or in combination with software to implement the invention. Thus, embodiments of the invention are not limited to any specific combination of hardware and software, unless otherwise explicitly stated herein.

The signals transmitted over the network link 1323 and other networks through the communication interface 1321, carry information to and from computer system 1300. The computer system 1300 can send and receive information, including program code, through the networks 1325, 1331 among others, through the network link 1323 and the communication interface 1321. In an example using the Internet 1331, the server host 1333 transmits program code for a particular application, requested by a message sent from the computer system 1300, through the Internet 1331, ISP equipment 1329, the local network 1325 and the communication interface 1321. The received code may be executed by the processor 1303 as it is received, or may be stored in the memory 1305 or in the storage device 1309 or any other non-volatile storage for later execution, or both. In this manner, the computer system 1300 may obtain application program code in the form of signals on a carrier wave.

Various forms of computer readable media may be involved in carrying one or more sequence of instructions or data or both to the processor 1303 for execution. For example, instructions and data may initially be carried on a magnetic disk of a remote computer such as the host 1327. The remote computer loads the instructions and data into its dynamic memory and sends the instructions and data over a telephone line using a modem. A modem local to the computer system 1300 receives the instructions and data on a telephone line and uses an infrared transmitter to convert the instructions and data to a signal on an infra-red carrier wave serving as the network link 1323. An infrared detector serving as the communication interface 1321 receives the instructions and data carried in the infrared signal and places information representing the instructions and data onto the bus 1301. The bus 1301 carries the information to the memory 1305 from which the processor 1303 retrieves and executes the instructions using some of the data sent with the instructions. The instructions and data received in the memory 1305 may optionally be stored on the storage device 1309, either before or after execution by the processor 1303.

FIG. 14 illustrates a chip set or chip 1400 upon which an embodiment of the invention may be implemented. The chip set 1400 is programmed to process and transmit sensor data in a bandwidth efficient manner as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1400 can be implemented in a single chip. It is further contemplated that in certain embodiments the chip set or chip 1400 can be implemented as a single "system on a chip." It is further contemplated that in certain embodiments a separate ASIC would not be used, for example, and that all relevant functions as disclosed herein would be performed by a processor or processors. The chip set or chip 1400, or a portion thereof, constitutes a means for performing one or more steps of providing user interface navigation information associated with the availability of functions. The chip set or chip 1400, or a portion thereof, constitutes a means for performing one or more steps for generating complete delivery data models for aerial delivery vehicles.

In one embodiment, the chip set or chip 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more Digital Signal Processors (DSP) 1407, or one or more Application-Specific Integrated Circuits (ASIC) 1409. The DSP 1407 typically is configured to process real-world signals (e.g., sound) in real time independently of the processor 1403. Similarly, the ASIC 1409 can be configured to performed specialized functions not easily performed by a more general purpose processor. Other specialized components to aid in performing the inventive functions described herein may include one or more Field Programmable Gate Arrays (FPGA), one or more controllers, or one or more other special-purpose computer chips.

In one embodiment, the chip set or chip 1400 includes merely one or more processors and some software and/or firmware supporting and/or relating to and/or for the one or more processors.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to generate complete delivery data models for aerial delivery vehicles. The memory 1405 also stores the data associated with or generated by the execution of the inventive steps.

Figure 15:
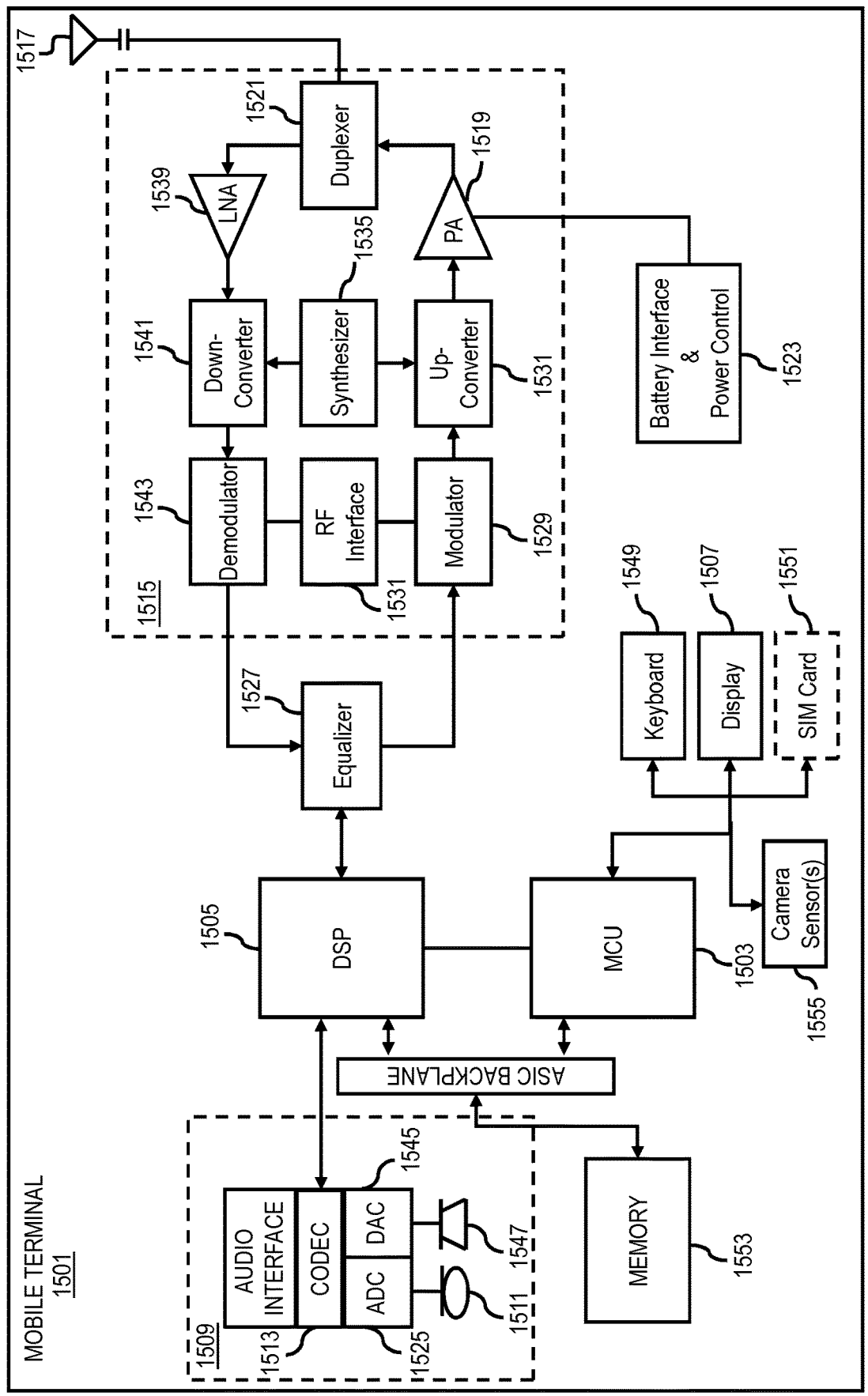
FIG. 15 is a diagram of a mobile terminal (e.g., handset) that can be used to implement an embodiment of the invention.

FIG. 15 is a diagram of exemplary components of a mobile terminal 1501 (e.g., handset) for communications, which is capable of operating in the system of FIG. 1, according to one embodiment. In some embodiments, the mobile terminal 1501, or a portion thereof, constitutes a means for generating complete delivery data models for aerial delivery vehicles. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile terminal functions that perform or support the steps for generating complete delivery data models for aerial delivery vehicles. The display 1507 includes display circuitry configured to display at least a portion of a user interface of the mobile terminal 1501 (e.g., mobile telephone). Additionally, the display 1507 and display circuitry are configured to facilitate user control of at least some functions of the mobile terminal 1501. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The antenna 1517 may work on Multiple Input Multiple Output (MIMO). MIMO is generally a part of wireless communication standards, such as IEEE 802.11 (Wi-Fi), 3G, WiMAX (4G), Long Term Evolution (LTE), and the like. The power amplifier (PA) 1519 and the transmitter/modulation circuitry are operationally responsive to the MCU 1503, with an output from the PA 1519 coupled to a duplexer 1521 or circulator or antenna switch, as known in the art. The PA 1519 also couples to a battery interface and a power control unit 1523.

In use, a user of the mobile terminal 1501 speaks into the microphone 1511 and his or her voice along with any detected background noise is converted into an analog voltage. The analog voltage is then converted into a digital signal through an Analog to Digital Converter (ADC) 1525. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as Enhanced Data rates for Global Evolution (EDGE), General Packet Radio Service (GPRS), Global System for Mobile Communications (GSM), Internet protocol Multimedia Subsystem (IMS), Universal Mobile Telecommunications System (UMTS), etc., as well as any other suitable wireless medium, e.g., microwave access (WiMAX), Long Term Evolution (LTE) networks, Code Division Multiple Access (CDMA), Wideband Code Division Multiple Access (WCDMA), Wireless Fidelity (Wi-Fi), satellite, and the like, or any combination thereof.

The encoded signals are then routed to an equalizer 1527 for compensation of any frequency-dependent impairments that occur during transmission though the air such as phase and amplitude distortion. After equalizing the bit stream, a modulator 1529 combines the signal with a RF signal generated in the RF interface 1531. The modulator 1529 generates a sine wave by way of frequency or phase modulation. In order to prepare the signal for transmission, an up-converter 1533 combines the sine wave output from the modulator 1529 with another sine wave generated by a synthesizer 1535 to achieve the desired frequency of transmission. The signal is then sent through the PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1537 to match impedances to provide maximum power transfer. Finally, the signal is transmitted via the antenna 1517 to a local base station. An Automatic Gain Control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1501 are received via the antenna 1517 and immediately amplified by a Low Noise Amplifier (LNA) 1539. A down-converter 1541 lowers the carrier frequency while a demodulator 1543 strips away the RF leaving only a digital bit stream. The signal then goes through the equalizer 1527 and is processed by the DSP 1505. A Digital to Analog Converter (DAC) 1545 converts the signal and the resulting output is transmitted to the user through a speaker 1547, all under control of the Main Control Unit (MCU) 1503 that can be implemented as a Central Processing Unit (CPU).

The MCU 1503 receives various signals including input signals from a keyboard 1549. The keyboard 1549 and/or the MCU 1503 in combination with other user input components (e.g., the microphone 1511) comprise a user interface circuitry for managing user input. The MCU 1503 runs user interface software to facilitate user control of at least some functions of the mobile terminal 1501 to generate complete delivery data models for aerial delivery vehicles. The MCU 1503 also delivers a display command and a switch command to the display 1507 and to the speech output switching controller, respectively. Further, the MCU 1103 exchanges information with the DSP 1505 and can access an optionally incorporated SIM card 1551 and a memory 1553. In addition, the MCU 1503 executes various control functions required of the terminal. The DSP 1505 may, depending upon the implementation, perform any of a variety of conventional digital processing functions on the voice signals. Additionally, the DSP 1505 determines the background noise level of the local environment from the signals detected by the microphone 1511 and sets the gain of microphone 1511 to a level selected to compensate for the natural tendency of the user of the mobile terminal 1501.

The CODEC 1513 includes the ADC 1525 and DAC 1545. The memory 1553 stores various data including call incoming tone data and is capable of storing other data including music data received via, e.g., the global Internet. The software module could reside in RAM memory, flash memory, registers, or any other form of writable storage medium known in the art. The memory 1553 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1551 carries, for instance, important information, such as the cellular phone number, the carrier supplying service, subscription details, and security information. The SIM card 1551 serves primarily to identify the mobile terminal 1501 on a radio network. The SIM card 1551 also contains a memory for storing a personal telephone number registry, text messages, and user specific mobile terminal settings.

Further, one or more camera sensors 1555 may be incorporated onto the mobile terminal 1501 wherein the one or more camera sensors 1555 may be placed at one or more locations on the mobile terminal 1501. Generally, the camera sensors 1555 may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining at least one delivery surface data object to represent one or more delivery surfaces of at least one delivery location, wherein the one or more delivery surfaces represent at least one surface upon which to deliver at least one package;
   determining one or more boundary elements to represent at least one boundary of the one or more delivery surfaces;
   causing, at least in part, an incorporation of the one or more boundary elements in the at least one delivery surface data object, wherein if a delivery edge associated with the one or more boundary elements is not defined, then the at least one delivery surface data object is specified as a middle of the one or more delivery surfaces;
   ranking the at least one delivery surface data object among a plurality of surface data objects according to one or more ranking criteria, wherein the one or more ranking criteria include delivery package information;
   causing, at least in part, a creation of at least one complete delivery data model based, at least in part, on the at least one delivery surface data object and the ranking of the at least one delivery surface data;
   causing, at least in part, an encoding of at least one geographic address in the at least one complete delivery data model to cause, at least in part, an association of the at least one complete delivery data model with the at least one geographic location;
   determining information about a shape of the at least one delivery surface data object using a knot vector and a set of control points; and
   storing the shape information.

2. A method of claim 1, further comprising:
   determining at least one restricted access surface data object to represent one or more restricted access surfaces associated with the at least one delivery location, wherein the one or more restricted access surfaces represent at least one surface that is impenetrable by at least one delivery vehicle,
   wherein the creation of the at least one complete delivery data model is further based, at least in part, on the at least one restricted access surface data object.

3. A method of claim 1, further comprising:
   determining at least one delivery edge from among the one or more boundary elements, wherein the at least one delivery edge represents at least one preferred edge for a delivery of the at least one package.

4. A method of claim 1, wherein the at least one delivery surface data object, the at least one complete delivery data model, or a combination thereof is specified with respect to one or more geographic point objects referenced according to a fixed world coordinate system.

5. A method of claim 1, wherein the ranking is included in the at least one complete delivery data model, and wherein the delivery package information includes weight, dimensions, content, and description of the at least one package.

6. A method of claim 1, wherein the one or more ranking criteria further include, at least in part, a proximity to one or more entrances associated with the geographic address, environmental conditions associated with the geographic address, environmental conditions associated with a delivery route, one or more crime statistics associated with the geographic address, a status of at least one aerial delivery vehicle, historical delivery information, one or more customer reviews, a user input, or a combination thereof.

7. A method of claim 1, wherein the association of the at least one complete delivery data model with the at least one geographic location further comprises associating the at least one complete delivery data model with at least one of:
   at least one link identifier of at least one map link in at least one map database;
   a percent distance from at least one reference node in the least one map database;
   a side of the at least one map link;
   a perpendicular distance from the at least one map link; and
   at least one Universal Location Reference (ULR).

8. A method of claim 1, further comprising:
   causing, at least in part, an encoding of delivery information, package information, recipient information, address information, sender information, or a combination thereof in one or more codes associated with the at least one package, the at least one delivery location, the at least one geographic location, or a combination thereof,
   wherein the one or more codes include one or more machine readable optical labels, one or more wireless beacon signals, one or more near field communication signals, or a combination thereof; and
   wherein the at least one delivery location includes, at least in part, at least one landing pad for at least one aerial delivery vehicle.

9. A method of claim 8, wherein the one or more codes are made available for reading by the at least one aerial delivery vehicle capable of delivering the at least one package, accepting the at least one package for delivery, or a combination thereof.

10. An apparatus comprising:
    at least one processor; and
    at least one memory including computer program code for one or more programs,
    the at least one memory and the computer program code configured to, with the at least one processor, cause the apparatus to perform at least the following:
      determine at least one delivery surface data object to represent one or more delivery surfaces of at least one delivery location, wherein the one or more delivery surfaces represent at least one surface upon which to deliver at least one package;
      determine one or more boundary elements to represent at least one boundary of the one or more delivery surfaces;
      cause, at least in part, an incorporation of the one or more boundary elements in the at least one delivery surface data object, wherein if a delivery edge associated with the one or more boundary elements is not defined, then the at least one delivery surface data object is specified as a middle of the one or more delivery surfaces;
      rank the at least one delivery surface data object among a plurality of surface data objects according to one or more ranking criteria, wherein the one or more ranking criteria include delivery package information;
      cause, at least in part, a creation of at least one complete delivery data model based, at least in part, on the at least one delivery surface data object and the ranking of the at least one delivery surface data;
      cause, at least in part, an encoding of at least one geographic address in the at least one complete delivery data model to cause, at least in part, an association of the at least one complete delivery data model with the at least one geographic location;
determine information about a shape of the at least one delivery surface data object using a knot vector and a set of control points; and
store the shape information.

11. An apparatus of claim 10, wherein the apparatus is further caused to:
determine at least one restricted access surface data object to represent one or more restricted access surfaces associated with the at least one delivery location, wherein the one or more restricted access surfaces represent at least one surface that is impenetrable by at least one delivery vehicle,
wherein the creation of the at least one complete delivery data model is further based, at least in part, on the at least one restricted access surface data objects.

12. An apparatus of claim 10, wherein the apparatus is further caused to:
determine at least one delivery edge from among the one or more boundary elements, wherein the at least one delivery edge represents at least one preferred edge for a delivery of the at least one package.

13. An apparatus of claim 10, wherein the at least one delivery surface data object, the at least one complete delivery data model, or a combination thereof is specified with respect to one or more geographic point objects referenced according to a fixed world coordinate system.

14. An apparatus of claim 10, wherein the ranking is included in the at least one complete delivery data model, and wherein the delivery package information includes weight, dimensions, content, and description of the at least one package.

15. An apparatus of claim 10, wherein the apparatus is further caused to:
cause, at least in part, an encoding of delivery information, package information, recipient information, address information, sender information, or a combination thereof in one or more codes associated with the at least one package, the at least one delivery location, the at least one geographic location, or a combination thereof,
wherein the one or more codes include one or more machine readable optical labels, one or more wireless beacon signals, one or more near field communication signals, or a combination thereof; and
wherein the at least one delivery location includes, at least in part, at least one landing pad for at least one aerial delivery vehicle.

16. A non-transitory computer-readable storage medium carrying one or more sequences of one or more instructions which, when executed by one or more processors, cause an apparatus to perform the following:
determine at least one delivery surface data object to represent one or more delivery surfaces of at least one delivery location, wherein the one or more delivery surfaces represent at least one surface upon which to deliver at least one package;
determine one or more boundary elements to represent at least one boundary of the one or more delivery surfaces;
cause, at least in part, an incorporation of the one or more boundary elements in the at least one delivery surface data object, wherein if a delivery edge associated with the one or more boundary elements is not defined, then the at least one delivery surface data object is specified as a middle of the one or more delivery surfaces;
rank the at least one delivery surface data object among a plurality of surface data objects according to one or more ranking criteria, wherein the one or more ranking criteria include delivery package information;
cause, at least in part, a creation of at least one complete delivery data model based, at least in part, on the at least one delivery surface data object and the ranking of the at least one delivery surface data;
cause, at least in part, an encoding of at least one geographic address in the at least one complete delivery data model to cause, at least in part, an association of the at least one complete delivery data model with at least one geographic location;
determine information about a shape of the at least one delivery surface data object using a knot vector and a set of control points; and
store the shape information.

17. A non-transitory computer-readable storage medium of claim 16, wherein the apparatus is further caused to perform the following:
determine at least one restricted access surface data object to represent one or more restricted access surfaces associated with the at least one delivery location, wherein the one or more restricted access surfaces represent at least one surface that is impenetrable by at least one delivery vehicle,
wherein the creation of the at least one complete delivery data model is further based, at least in part, on the at least one restricted access surface data objects.

18. A non-transitory computer-readable storage medium of claim 16, wherein the apparatus is further caused to perform the following:
determine one or more boundary elements to represent at least one boundary of the one or more delivery surfaces; and
cause, at least in part, an incorporation of the one or more boundary elements in the at least one delivery surface data object.

19. A method comprising:
determining at least one delivery surface data object to represent one or more delivery surfaces of at least one delivery location, wherein the one or more delivery surfaces represent at least one surface upon which to deliver at least one package;
determining one or more boundary elements to represent at least one boundary of the one or more delivery surfaces;
causing, at least in part, an incorporation of the one or more boundary elements in the at least one delivery surface data object, wherein if a delivery edge associated with the one or more boundary elements is not defined, then the at least one delivery surface data object is specified as a middle of the one or more delivery surfaces;
ranking the at least one delivery surface data object among a plurality of surface data objects according to one or more ranking criteria, wherein the one or more ranking criteria include delivery package information;
causing, at least in part, a creation of at least one complete delivery data model based, at least in part, on the at least one delivery surface data object and the ranking of the at least one delivery surface data; and
causing, at least in part, an encoding of at least one geographic address in the at least one complete delivery data model to cause, at least in part, an association of the at least one complete delivery data model with the at least one geographic location, wherein the one or more boundary elements are modeled according to either a Non-Rational Bezier Spline or a Non-Uniform Rational Basis Spline (NURBS).

* * * * *